United States Patent
Ono et al.

(10) Patent No.: US 11,015,840 B2
(45) Date of Patent: May 25, 2021

(54) WORKING FLUID FOR HEAT CYCLE, COMPOSITION FOR HEAT CYCLE SYSTEM, AND HEAT CYCLE SYSTEM

(71) Applicant: AGC Inc., Chiyoda-ku (JP)

(72) Inventors: Hikaru Ono, Chiyoda-ku (JP); Katsuya Ueno, Chiyoda-ku (JP); Tetsuo Otsuka, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 87 days.

(21) Appl. No.: 16/292,371

(22) Filed: Mar. 5, 2019

(65) Prior Publication Data

US 2019/0257553 A1    Aug. 22, 2019

Related U.S. Application Data

(63) Continuation of application No. PCT/JP2017/031946, filed on Sep. 5, 2017.

(30) Foreign Application Priority Data

Sep. 7, 2016    (JP) .............................. JP2016-174940

(51) Int. Cl.
  *F25B 9/00*     (2006.01)
  *C09K 5/04*    (2006.01)
  *F25B 1/00*    (2006.01)

(52) U.S. Cl.
  CPC ............... *F25B 9/002* (2013.01); *C09K 5/04* (2013.01); *C09K 5/045* (2013.01); *F25B 1/00* (2013.01); *C09K 2205/122* (2013.01); *C09K 2205/126* (2013.01); *C09K 2205/22* (2013.01); *C09K 2205/40* (2013.01); *Y02P 20/10* (2015.11)

(58) Field of Classification Search
  CPC .... C09K 5/04; C09K 5/045; C09K 2205/122; C09K 2205/126; C09K 2205/22; C09K 2205/40; F25B 1/00; F25B 9/002; Y02P 20/10
  USPC .................. 252/67, 68, 69; 62/529
  See application file for complete search history.

(56) References Cited

U.S. PATENT DOCUMENTS

| | | | | |
|---|---|---|---|---|
| 7,807,074 | B2 * | 10/2010 | Luly ........................ | H01B 3/56 252/571 |
| 9,725,632 | B2 * | 8/2017 | Ueno ................. | C10M 171/008 |
| 9,862,868 | B2 * | 1/2018 | Fukushima ............ | C09K 5/045 |
| 10,131,827 | B2 * | 11/2018 | Fukushima ............ | C09K 5/045 |
| 10,787,597 | B2 * | 9/2020 | Fukushima ............ | C09K 5/045 |
| 2008/0135817 | A1 * | 6/2008 | Luly ........................ | H01B 3/56 252/571 |
| 2014/0070132 | A1 | 3/2014 | Fukushima | |
| 2015/0376486 | A1 * | 12/2015 | Hashimoto ............ | C09K 5/045 252/67 |
| 2016/0002518 | A1 | 1/2016 | Taniguchi et al. | |
| 2016/0075927 | A1 | 3/2016 | Fukushima | |
| 2016/0097569 | A1 * | 4/2016 | Matsunaga ............. | F25B 49/02 62/324.6 |
| 2016/0333243 | A1 * | 11/2016 | Fukushima ............ | C09K 5/044 |
| 2016/0333244 | A1 * | 11/2016 | Fukushima ............ | C09K 5/045 |
| 2016/0347693 | A1 | 12/2016 | Fukushima et al. | |
| 2016/0347980 | A1 | 12/2016 | Okamoto | |
| 2016/0347982 | A1 | 12/2016 | Fukushima et al. | |
| 2016/0355716 | A1 | 12/2016 | Fukushima et al. | |
| 2016/0369146 | A1 * | 12/2016 | Ueno ..................... | C09K 5/045 |
| 2017/0016660 | A1 | 1/2017 | Nishiyama et al. | |
| 2018/0079941 | A1 * | 3/2018 | Ueno ..................... | C09K 5/044 |
| 2019/0031933 | A1 * | 1/2019 | Nishiyama .............. | F25B 9/006 |
| 2020/0216735 | A1 * | 7/2020 | Itano ........................ | C09K 5/045 |
| 2020/0224071 | A1 * | 7/2020 | Low ................... | C10M 171/008 |

FOREIGN PATENT DOCUMENTS

| | | | |
|---|---|---|---|
| EP | 3 305 869 A1 | 4/2018 | |
| JP | 5783341 B1 | 9/2015 | |
| WO | WO 2012/157764 A1 | 11/2012 | |
| WO | WO 2014/178353 A1 | 11/2014 | |
| WO | WO 2015/005290 A1 | 1/2015 | |
| WO | WO-2015015881 A1 * | 2/2015 | ............. F25B 13/00 |
| WO | WO 2015/125877 A1 | 8/2015 | |

(Continued)

OTHER PUBLICATIONS

International Search Report dated Dec. 12, 2017 in PCT/JP2017/031946 filed Sep. 5, 2017 (with English Translation).

(Continued)

*Primary Examiner* — Douglas J McGinty

(74) *Attorney, Agent, or Firm* — Oblon, McClelland, Maier & Neustadt, L.L.P.

(57) ABSTRACT

An object of the present invention is to provide, as a working fluid to be used for a heat cycle system, a working fluid for heat cycle that has cycle performance replaceable with that of R410A, and at the same time, has a small burden on an apparatus, low flammability, suppressed self-decomposition, and less effect on global warming, and therefore, is usable stably even if leaked, a composition for heat cycle system containing the same, and a heat cycle system using the composition. The working fluid for heat cycle contains trifluoroethylene, difluoromethane, and at least one selected from 1,1-difluoroethane, fluoroethane, propane, propylene, carbon dioxide, 2,3,3,3-tetrafluoropropene, and (E)-1,3,3,3-tetrafluoropropene at mass ratios satisfying predetermined expressions and at a ratio of the total content to be 90 to 100 mass % relative to the total amount of the working fluid and has a temperature glide of 10° C. or less.

21 Claims, 3 Drawing Sheets

(56) References Cited

FOREIGN PATENT DOCUMENTS

| WO | WO 2015/125878 A1 | 8/2015 | | |
|----|-------------------|--------|---|---|
| WO | WO 2015/125880 A1 | 8/2015 | | |
| WO | WO 2015/125885 A1 | 8/2015 | | |
| WO | WO-2015115252 A1 * | 8/2015 | ............. | C09K 5/045 |
| WO | WO-2015115550 A1 * | 8/2015 | ............. | C09K 5/045 |
| WO | WO 2015/140884 A1 | 9/2015 | | |
| WO | WO 2015/141677 A1 | 9/2015 | | |

OTHER PUBLICATIONS

Written Opinion dated Dec. 12, 2017 in PCT/JP2017/031946 filed Sep. 5, 2017.

* cited by examiner

WORKING FLUID FOR HEAT CYCLE, COMPOSITION FOR HEAT CYCLE SYSTEM, AND HEAT CYCLE SYSTEM

CROSS-REFERENCE TO RELATED APPLICATIONS

This application is a continuation of prior International Application No. PCT/JP2017/031946 filed on Sep. 5, 2017 which is based upon and claims the benefit of priority from Japanese Patent Application No. 2016-174940 filed on Sep. 7, 2016; the entire contents of all of which are incorporated herein by reference.

FIELD

The present invention relates to a working fluid for heat cycle, a composition for heat cycle system containing the same, and a heat cycle system using the composition.

BACKGROUND

Conventionally, as working fluids for a heat cycle system such as a refrigerant for a refrigerator, a refrigerant for an air-conditioning apparatus, a working fluid for a power generation system (such as an exhaust heat recovery power generation), a working fluid for a latent heat transport apparatus (such as a heat pipe), and a secondary cooling medium, chlorofluorocarbon (CFC) such as chlorotrifluoromethane and dichlorodifluoromethane and hydrochlorofluorocarbon (HCFC) such as chlorodifluoromethane have been used. However, effects of CFC and HCFC on the ozone layer in the stratosphere have been pointed out, and they are subjected to regulation at present.

Under such circumstances, as a working fluid for heat cycle to be used for a heat cycle system, hydrofluorocarbon (HFC) having less effect on the ozone layer, such as difluoromethane (HFC-32), tetrafluoroethane, and pentafluoroethane (HFC-125), has been used in place of CFC and HCFC. For example, R410A (a pseudoazeotropic mixture refrigerant of HFC-32 and HFC-125 at a mass ratio of 1:1) or the like is a refrigerant that has been widely used conventionally. However, it has been pointed out that HFC may cause global warming.

R410A has been widely used for normal air-conditioning apparatuses or the like what is called a packaged air-conditioner and a room air-conditioner due to its high refrigerating capacity. However, R410A has a global warming potential (GWP) as high as 2088, and therefore, the development of a low GWP working fluid has been required. In this case, there has been required development of a working fluid on the premise that an apparatus that has been used is continuously used as it is just by replacing R410A.

In recent years, expectations are concentrated on hydrofluoroolefin (HFO), that is, HFC having a carbon-carbon double bond, which is a working fluid having less effect on the ozone layer and less effect on global warming because the carbon-carbon double bond is likely to be decomposed by OH radicals in the air. In this description, saturated HFC is called HFC and discriminated from HFO unless otherwise noted. Further, HFC is sometimes clearly described as saturated hydrofluorocarbon.

As a working fluid using HFO, for example, there has been disclosed a technique relating to a working fluid using trifluoroethylene (HFO-1123) having the above-described properties and capable of obtaining excellent cycle performance in Patent Reference 1 (International Publication No. 2012/157764). In Patent Reference 1, there has further been attempted to enable a working fluid in which various HFC and HFO are combined with HFO-1123 in order to increase nonflammability, cycle performance, and so on of the working fluid.

Here, HFO-1123 sometimes causes what is called a self-decomposition reaction when there is an ignition source at higher temperature or under high pressure. Therefore, there has been attempted to obtain a working fluid in which the working fluid using HFO-1123 is combined with other components to suppress the self-decomposition reaction of HFO-1123. There has been described in, for example, Patent Reference 2 (Japanese Patent No. 5783341) that a working fluid having high durability in which HFO-1123, HFC-32, and 2,3,3,3-tetrafluoropropene (HFO-1234yf) are mixed at a predetermined ratio to thereby suppress the self-decomposition reaction of HFO-1123 is obtained.

However, as the working fluid to be used for the heat cycle system, a safer working fluid that is lower in environmental burden and higher in performance has been required, and a working fluid for heat cycle in which the self-decomposition reaction of HFO-1123 is suppressed under conditions stricter than those described in Patent Reference 2, for example, has been required.

SUMMARY OF THE INVENTION

An object of the present invention is to provide, as a working fluid to be used for a heat cycle system, a working fluid for heat cycle that has cycle performance replaceable with that of R410A, and at the same time, has a small burden on an apparatus, low flammability, suppressed self-decomposition, and less effect on global warming, and therefore, is usable stably even if leaked, a composition for heat cycle system containing the same, and a heat cycle system using the composition.

The present invention provides a working fluid for heat cycle, a composition for heat cycle system, and a heat cycle system that have the following configurations.

A working fluid for heat cycle according to a first aspect of the present invention is a working fluid for heat cycle containing trifluoroethylene and difluoromethane, the working fluid for heat cycle further containing: at least one compound selected from the group consisting of 1,1-difluoroethane, fluoroethane, propane, propylene, carbon dioxide, 2,3,3,3-tetrafluoropropene, and (E)-1,3,3,3-tetrafluoropropene, in which the total content ratio of trifluoroethylene, difluoromethane, 1,1-difluoroethane, fluoroethane, propane, propylene, carbon dioxide, 2,3,3,3-tetrafluoropropene, and (E)-1,3,3,3-tetrafluoropropene relative to the total amount of the working fluid for heat cycle is 90 to 100 mass %, content ratios by mass of the respective compounds satisfy all Expression A to Expression E below when the total content of trifluoroethylene, difluoromethane, 1,1-difluoroethane, fluoroethane, propane, propylene, carbon dioxide, 2,3,3,3-tetrafluoropropene, and (E)-1,3,3,3-tetrafluoropropene contained in the working fluid for heat cycle is set to 1, and a temperature glide is 10° C. or less when operating a standard refrigeration cycle system under a temperature condition (T) that in the case of the working fluid for heat cycle being a zeotropic mixture, an average temperature of an evaporation start temperature and an evaporation completion temperature is 0° C., in the case of the working fluid for heat cycle being an azeotropic mixture, an evaporation temperature is 0° C., in the case of the working fluid for heat cycle being a zeotropic mixture, an average temperature of a condensation start temperature and a condensation completion temperature is 40° C., in the case of the working fluid for heat cycle being an azeotropic mixture, a condensation temperature is 40° C. a degree of supercooling (SC) is 5° C., and a degree of superheating (SH) is 5° C., $$0<-1.000\times[HFO\text{-}1123]+1.179\times[R32]+1.316\times[1234yf]+1.316\times[1234ze(E)]+3.831\times[CO2]+2.632\times[R152a]+2.390\times[R161]+6.262\times[\text{propane}]+2.237\times[\text{propylene}], \quad \text{Expression A;}$$

$$10>3.426\times[HFO\text{-}1123]+5.673\times[R32]+2.193\times[1234yf]-0.596\times[1234ze(E)]-0.768\times[CO2]+29.897\times[R152a]+64.400\times[R161]+118.965\times[\text{propane}]+94.943\times[\text{propylene}], \quad \text{Expression B;}$$

$$1.78>1.293\times[HFO\text{-}1123]+1.029\times[R32]+0.369\times[1234yf]+0.354\times[1234ze(E)]+3.807\times[CO2]+0.229\times[R152a]+0.406\times[R161]+0.568\times[\text{propane}]+0.719\times[\text{propylene}], \quad \text{Expression C;}$$

$$0.91<1.214\times[HFO\text{-}1123]+1.133\times[R32]+0.402\times[1234yf]+0.346\times[1234ze(E)]+3.359\times[CO2]+0.323\times[R152a]+0.548\times[R161]+0.588\times[\text{propane}]+0.725\times[\text{propylene}], \text{ and} \quad \text{Expression D;}$$

$$160>0.3\times[HFO\text{-}1123]+675\times[R32]+4\times[1234yf]+6\times[1234ze(E)]+1\times[CO2]+124\times[R152a]+12\times[R161]+3.3\times[\text{propane}]+1.8\times[\text{propylene}], \quad \text{Expression E;}$$

where in Expression A to Expression E, [HFO-1123] represents the content ratio by mass of trifluoroethylene, [R32] represents the content ratio by mass of difluoromethane, [R152a] represents the content ratio by mass of 1,1-difluoroethane, [R161] represents the content ratio by mass of fluoroethane, [propane] represents the content ratio by mass of propane, [propylene] represents the content ratio by mass of propylene, [CO2] represents the content ratio by mass of carbon dioxide, [1234yf] represents the content ratio by mass of 2,3,3,3-tetrafluoropropene, and [1234ze(E)] represents the content ratio by mass of (E)-1,3,3,3-tetrafluoropropene respectively when the total content of trifluoroethylene, difluoromethane, 1,1-difluoroethane, fluoroethane, propane, propylene, carbon dioxide, 2,3,3,3-tetrafluoropropene, and (E)-1,3,3,3-tetrafluoropropene is set to 1.

A working fluid for heat cycle according to a second aspect of the present invention is a working fluid for heat cycle containing trifluoroethylene and difluoromethane, the working fluid for heat cycle further containing: at least one compound selected from the group consisting of 1,1-difluoroethane, fluoroethane, propane, propylene, carbon dioxide, 2,3,3,3-tetrafluoropropene, and (E)-1,3,3,3-tetrafluoropropene, in which the total content ratio of trifluoroethylene, difluoromethane, 1,1-difluoroethane, fluoroethane, propane, propylene, carbon dioxide, 2,3,3,3-tetrafluoropropene, and (E)-1,3,3,3-tetrafluoropropene relative to the total amount of the working fluid for heat cycle is 90 to 100 mass %, content ratios by mass of the respective compounds satisfy all Expression A2 below and Expression B, Expression C, Expression D, and Expression E above when the total content of trifluoroethylene, difluoromethane, 1,1-difluoroethane, fluoroethane, propane, propylene, carbon dioxide, 2,3,3,3-tetrafluoropropene, and (E)-1,3,3,3-tetrafluoropropene contained in the working fluid for heat cycle is set to 1, and a temperature glide is 10° C. or less when operating a standard refrigeration cycle system under a temperature condition (T) that in the case of the working fluid for heat cycle being a zeotropic mixture, an average temperature of an evaporation start temperature and an evaporation completion temperature is 0° C., in the case of the working fluid for heat cycle being an azeotropic mixture, an evaporation temperature is 0° C., in the case of the working fluid for heat cycle being a zeotropic mixture, an average temperature of a condensation start temperature and a condensation completion temperature is 40° C., in the case of the working fluid for heat cycle being an azeotropic mixture, a condensation temperature is 40° C., a degree of supercooling (SC) is 5° C., and a degree of superheating (SH) is 5° C., $$0<-1.000\times[HFO\text{-}1123]+1.033\times[R32]+0.896\times[1234yf]+0.896\times[1234ze(E)]+2.891\times[CO2]+1.955\times[R152a]+1.410\times[R161]+3.737\times[\text{propane}]+1.520\times[\text{propylene}], \quad \text{Expression A2;}$$

where in Expression A2, [HFO-1123], [R32], [R152a], [R161], [propane], [propylene], [CO2], [1234yf], and [1234ze(E)] mean the same as those in [1] above.

The present invention provides a composition for heat cycle system containing the working fluid for heat cycle according to the first aspect or the second aspect of the present invention and a lubricating oil. The present invention provides a heat cycle system using the composition for heat cycle system of the present invention.

According to the present invention, as a working fluid to be used for a heat cycle system, it is possible to obtain a working fluid that has cycle performance replaceable with that of R410A and at the same time, has a small burden on an apparatus. Further, it is possible to provide a working fluid for heat cycle that has low flammability, suppressed self-decomposition, and less effect on global warming, and therefore, is usable stably even if leaked and a composition for heat cycle system containing the same. The heat cycle system of the present invention is a heat cycle system that does not require special processes on an apparatus and to which the composition for heat cycle system replaceable with R410A and having less effect on global warming is applied.

MODE FOR CARRYING OUT THE INVENTION

Figure 1:
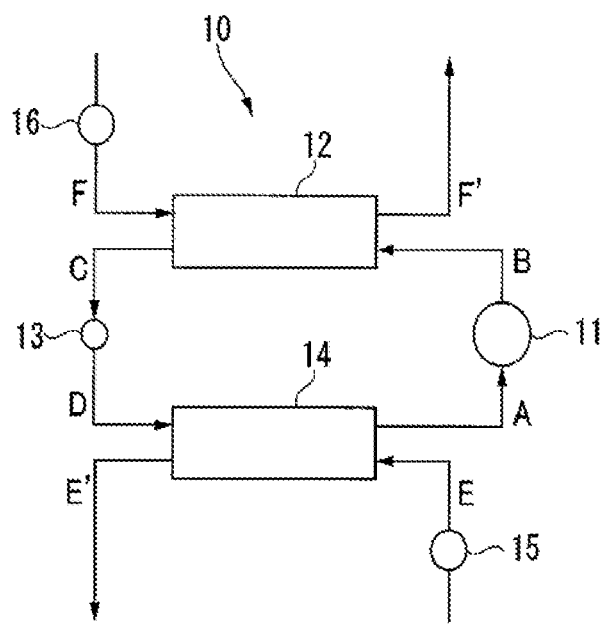
FIG. 1 is a schematic configuration diagram illustrating one example of a standard refrigeration cycle system that evaluates a heat cycle system of the present invention.

Hereinafter, there will be explained embodiments of the present invention. Incidentally, in this description, for halogenated hydrocarbons, an abbreviated name of a compound is described between parentheses after the compound name, and the abbreviated name is used in place of the compound name as needed in this description. Further, (E) and (Z) added to the name or abbreviation of a compound having a geometric isomer represent an E-isomer (trans-isomer) and a Z-isomer (cis-isomer) respectively. The name or abbreviation of the compound without the notation of the E-isomer or the Z-isomer means a generic name including the E-isomer, the Z-isomer, or a mixture of the E-isomer and the Z-isomer. In this description, "to" indicating the numerical value range includes upper and lower limits.

In this description, [HFO-1123] represents the content ratio by mass of trifluoroethylene, [R32] represents the content ratio by mass of difluoromethane, [R152a] represents the content ratio by mass of 1,1-difluoroethane, [R161] represents the content ratio by mass of fluoroethane, [propane] represents the content ratio by mass of propane, [propylene] represents the content ratio by mass of propylene, [CO2] represents the content ratio by mass of carbon dioxide, [1234yf] represents the content ratio by mass of 2,3,3,3-tetrafluoropropene, and [1234ze(E)] represents the content ratio by mass of (E)-1,3,3,3-tetrafluoropropene respectively when the total content of trifluoroethylene, difluoromethane, 1,1-difluoroethane, fluoroethane, propane, propylene, carbon dioxide, 2,3,3,3-tetrafluoropropene, and (E)-1,3,3,3-tetrafluoropropene is set to 1 unless otherwise noted.

Of the present invention, a working fluid for heat cycle in a first aspect is also referred to as a first working fluid and a working fluid for heat cycle in a second aspect is also referred to as a second working fluid. Further, in this description, the case of a simple working fluid indicates both the first working fluid and the second working fluid.

The first working fluid and the second working fluid each contain
  trifluoroethylene (HFO-1123),
  difluoromethane (HFC-32 or R-32, or to be also referred to as R32), and
  at least one selected from 1,1-difluoroethane (HFC-152a or R-152a, or to be also referred to as R152a), fluoroethane (HFC-161 or R-161, or to be also referred to as R161), propane, propylene, carbon dioxide, 2,3,3,3-tetrafluoropropene (HFO-1234yf, or to be also referred to as 1234yf), and (E)-1,3,3,3-tetrafluoropropene (HFO-1234ze(E), or to be also referred to as 1234ze(E))
  at the following content ratios.

The total content ratio of HFO-1123, R32, R152a, R161, propane, propylene, carbon dioxide, 1234yf, and 1234ze(E) in the working fluid is 90 to 100 mass % relative to the total amount of the working fluid. The content ratio of each compound in the working fluid is the content ratio by mass of each compound when the total content of all these compounds in the working fluid is set to 1, and is the ratio satisfying all Expression A, Expression B, Expression C, Expression D, and Expression E described above in the first working fluid. The content ratio of each compound in the working fluid is the ratio satisfying all Expression A2, Expression B, Expression C, Expression D, and Expression E described above in the second working fluid.

Further, the working fluid of the present invention has a temperature glide of 10° C. or less when operating a standard refrigeration cycle system under the following temperature condition (T).

[Temperature Condition (T)]

The average temperature of an evaporation start temperature and an evaporation completion temperature in the case of the working fluid being a zeotropic mixture, and the evaporation start temperature in the case of the working fluid being an azeotropic mixture are 0° C.

The average temperature of a condensation start temperature and a condensation completion temperature in the case of the working fluid being a zeotropic mixture, and the condensation temperature in the case of the working fluid being an azeotropic mixture are 40° C.

Degree of supercooling (SC) is 5° C.
Degree of superheating (SH) is 5° C.

Expressions A to Expression E described above in the first working fluid are relational expressions of the content ratios by mass of the above-described compounds intended for satisfying the following properties of (A) to (E) corresponding to Expressions A to Expression E respectively in a working fluid composed of only HFO-1123, R32, and at least one selected from R152a, R161, propane, propylene, carbon dioxide, 1234yf, and 1234ze(E). Hereinafter, the working fluid having a composition composed of only HFO-1123, R32, and at least one selected from R152a, R161, propane, propylene, carbon dioxide, 1234yf, and 1234ze(E) and satisfying Expressions A to Expression E is referred to as a working fluid (R1).

(A) A self-decomposition reaction is not caused at 215° C. and at 10 MPaG.

(B) A combustion speed is less than 10 cm/sec.

(C) A relative pressure ($RDP_{R410}A$) expressed by Expression (Z) below is less than 1.78.

$$\text{Relative pressure } (RDP_{R410A}) = \frac{\text{Compressor discharge gas pressure of sample } (DP_{sample})}{\text{Compressor discharge gas pressure of } R410A\ (DP_{R410A})} \quad (Z)$$

In Expression (Z), R410A indicates a mixture of R32 and pentafluoroethane (HFC-125 or R-125, or to be also referred to as R125) at a mass ratio of 1:1 and a sample indicates a working fluid to be evaluated relatively. Compressor discharge gas pressures of the sample and R410A are compressor discharge gas pressures obtained when operating the standard refrigeration cycle system under the above-described temperature condition (T) using the sample and R410A.

(D) Relative refrigerating capacity ($RQ_{R410A}$) expressed by Expression (X) below exceeds 0.91.

$$\text{Relative refrigerating capacity } (RQ_{R410A}) = \frac{\text{Refrigerating capacity of sample } (Q_{sample})}{\text{Refrigerating capacity of } R410A\ (Q_{R410A})} \quad (X)$$

In Expression (X), R410A is the same as that in Expression (Z) and a sample indicates a working fluid to be evaluated relatively. Refrigerating capacities of the sample and R410A are outputs (kW) obtained when operating the standard refrigeration cycle system under the above-described temperature condition (T) using the sample and R410A.

(E) The global warming potential (100 years) in the Intergovernmental Panel on Climate Change (IPCC) Fourth Assessment Report is less than 160. In the following explanation, the above-described global warming potential is also referred to as "GWP."

The first working fluid obtains the properties equivalent to those of (A) to (E) above by containing the working fluid (R1) having the above-described properties of (A) to (E) by 90 to 100 mass % relative to the total amount of the working fluid. The first working fluid has the above-described temperature glide property in addition to these properties, to thereby obtain cycle performance replaceable with that of R410A, and at the same time, have a small burden on an apparatus, low flammability, suppressed self-decomposition, and less effect on global warming, and therefore, be usable stably even if leaked.

In the present invention, in order to bring each of the above-described properties to a satisfactory level, the combination of HFO-1123 and R32 is selected, and further the composition combining with at least one selected from R152a, R161, propane, propylene, carbon dioxide, 1234yf, and 1234ze(E) is selected. Then, in the mixture composed of HFO-1123, R32, and at least one selected from R152a, R161, propane, propylene, carbon dioxide, 1234yf, and 1234ze(E), the working fluid (R1) having the composition satisfying the above-described properties of (A) to (E) is found out. Incidentally, in the working fluid (R1), the temperature glide is preferred to be 10° C. or less, and the working fluid (R1) having the temperature glide of 10° C. or less is usable as the first working fluid as it is.

The second working fluid is a working fluid in which the content ratios of HFO-1123, R32, and at least one selected from R152a, R161, propane, propylene, carbon dioxide, 1234yf, and 1234ze(E) are adjusted so as to obtain a property not causing the self-decomposition reaction under a stricter condition while maintaining the other properties as compared to the first working fluid.

The second working fluid contains a working fluid (to be referred to as a working fluid (R2) hereinafter) having a composition composed of only HFO-1123, R32, and at least one selected from R152a, R161, propane, propylene, carbon dioxide, 1234yf, and 1234ze(E) and satisfying Expression A2, Expression B, Expression C, Expression D, and Expression E by 90 to 100 mass % relative to the total amount of the working fluid.

The working fluid (R2) has the above-described properties of (B) to (E) and further has a property of (A2) in which the self-decomposition reaction is not caused under a condition stricter than (A) described above and pyrolyzed products resulting from an ignition test are smaller than those of (A) described above.

The second working fluid obtains the properties equivalent to those of (A2) and (B) to (E) above by containing the working fluid (R2) having the above-described properties of (A2) and (B) to (E) by 90 to 100 mass % relative to the total amount of the working fluid. The second working fluid has the above-described temperature glide property in addition to these properties, to thereby obtain cycle performance replaceable with that of R410A, and at the same time, have a small burden on an apparatus, low flammability, suppressed self-decomposition, and less effect on global warming, and therefore, be usable stably even if leaked. Incidentally, in the working fluid (R2) itself as well, the temperature glide is preferred to be 10° C. or less, and the working fluid (R2) having the temperature glide of 10° C. or less is usable as the second working fluid as it is. Hereinafter, the working fluid (R1) and the working fluid (R2) will be explained.

In Table 1, properties of HFO-1123, R32, R152a, R161, propane, propylene, carbon dioxide, 1234yf, and 1234ze(E) as a single compound, reference values of (A) to (E) described above in the properties, and a reference value of the temperature glide in the working fluid of the present invention are illustrated, together with properties of R410A as the working fluid. Incidentally, $RCOP_{R410A}$ illustrated in Table 1 is a relative coefficient of performance with respect to R410A expressed by Expression (Y) below. In the working fluid, $RCOP_{R410A}$ is preferred to be greater than 0.9.

$$\text{Relative coefficient of performance } (RCOP_{R410A}) = \frac{\text{Coefficient of performance of sample } (COP_{sample})}{\text{Coefficient of performance of R410A } (COP_{R410A})} \quad (Y)$$

In Expression (Y), R410A is the same as that in Expression (Z), and a sample indicates a working fluid to be evaluated relatively. Coefficients of performance of the sample and R410A are coefficients of performance obtained when operating the standard refrigeration cycle system under the above-described temperature condition (T) using the sample and R410A.

TABLE 1

| Compound/ Evaluation item [Unit] | GWP | Self decomposition (215° C., 10MPaG) | Combustion speed [cm/sec] | $RCOP_{R410A}$ | $RQ_{R410A}$ | Temperature glide [° C.] | $RDP_{R410A}$ |
|---|---|---|---|---|---|---|---|
| Reference value | <160 | Absent | <10 | >0.9 | >0.91 | ≤10 | <1.78 |
| R410A | 2088.0 | Absent | Non flammable | 1.00 | 1.00 | 0.1 | 1.00 |
| HFO-1123 | 0.3 | Present | 6.6 | 0.92 | 1.11 | 0.0 | 1.25 |
| R32 | 675.0 | Absent | 6.7 | 1.02 | 1.09 | 0.0 | 1.02 |
| 1234yf | 4.0 | Absent | 1.5 | 1.03 | 0.41 | 0.0 | 0.42 |
| 1234ze(E) | 6.0 | Absent | Non flammable | 1.07 | 0.32 | 0.0 | 0.32 |
| Carbon dioxide | 1.0 | Absent | Non flammable | — | — | 0.0 | — |
| R152a | 124.0 | Absent | 23.5 | 1.10 | 0.41 | 0.0 | 0.38 |
| R161 | 12.0 | Absent | 38.3 | 1.07 | 0.61 | 0.0 | 0.56 |
| Propane | 3.3 | Absent | 43.0 | 1.05 | 0.58 | 0.0 | 0.57 |
| Propylene | 1.8 | Absent | 47.0 | 1.04 | 0.70 | 0.0 | 0.68 |

[–]; Carbon dioxide is brought into a supercritical state at the condensation temperature, and thus $RCOP_{410A}$, $RQ_{R410A}$, and $RDP_{R410A}$ are incalculable.

There will be explained the respective components contained in the working fluid (R1) and the working fluid (R2) using Table 1. Incidentally, Table 1 does not include a column where the property of (A2) is described, but the condition of the self-decomposition of (A2) is stricter than that of (A). Even under the condition of (A2), only HFO-1123 has the self-decomposition and the components other than that do not have the self-decomposition.

HFO-1123 and R32 can be cited as the component having the cycle performance replaceable with that of R410A from Table 1. However, HFO-1123 has the self-decomposition and R32 has a high GWP. Here, the combination of HFO-1123 and R32 fails to satisfy the self-decomposition or the GWP out of the above-described properties of (A), (A2), (B) to (E), the temperature glide, and $RCOP_{R410A}$ in any composition.

Thus, in the present invention, as a compound or a combination of compounds that has a GWP lower than that of R32, is capable of suppressing the self-decomposition of HFO-1123, and further does not impair the other properties, one or more selected from R152a, R161, propane, propylene, carbon dioxide, 1234yf, and 1234ze(E) are selected to find out an appropriate composition in the combination of HFO-1123 and R32. The above-described properties of (A), (A2), and (B) to (E) will be explained together with Expression A, Expression A2, and Expression B to Expression E. Further, $RCOP_{R410A}$ and the temperature glide will be explained.

[Self-Decomposition]

The properties of (A) and (A2) are properties relating to the self-decomposition. HFO-1123 contained in the working fluid (R1) and the working fluid (R2) has self-decomposition. The self-decomposition can be suppressed by kinds of components composing the working fluid (R1) and the working fluid (R2) together with HFO-1123 and the content ratios of the respective components (to be referred to as a "composition" hereinafter) of the working fluid (R1) and the working fluid (R2). The self-decomposition of the working fluid is required to be suppressed under the condition of high temperature and high pressure in excess of ranges of temperature and pressure to be used normally as the working fluid.

In the working fluid (R1), the composition satisfies Expression A, thereby not causing the self-decomposition reaction under the condition of temperature of 215° C. and pressure of 10 MPaG in a self-decomposition test to be evaluated by the following method. Incidentally, MPaG being the unit of pressure indicates MPa in terms of gauge pressure.

Expression A is expressed by "0<−1.000×[HFO-1123]+1.179×[R32]+1.316×[1234yf]+1.316×[1234ze(E)]+3.831×[CO2]+2.632×[R152a]+2.390×[R161]+6.262×[propane]+2.237×[propylene]." In Expression A, regarding coefficients to multiply the content ratios of the compounds, the negative coefficient indicates how easily the compound causes the self-decomposition and the positive coefficient indicates how easily the compound suppresses the self-decomposition. A compound having a larger coefficient means suppression of the self-decomposition of HFO-1123 by a smaller content.

In the working fluid (R2), the composition satisfies Expression A2, and thereby, as compared to the working fluid (R1), a composition with a smaller content ratio of HFO-1123 is made and use under a stricter condition of the self-decomposition is enabled. The composition satisfies Expression A2, and thereby a less amount of pyrolyzed product is generated at the ignition test as compared to (A) above.

$$0<-1.000\times[HFO\text{-}1123]+1.033\times[R32]+0.896\times[1234yf]+0.896\times[1234ze(E)]+2.891\times[CO2]+1.955\times[R152a]+1.410\times[R161]+3.737\times[\text{propane}]+1.520\times[\text{propylene}] \quad \text{Expression A2;}$$

<Self-Decomposition Test>

The self-decomposition test is conducted using a facility compliant with the A method recommended as a facility for measuring a combustion range of gas made by mixing gas containing halogen in an individual notification in High Pressure Gas Safety Act.

Concretely, a working fluid to be a sample is enclosed, to a predetermined pressure, within a spherical pressure tight case having an internal volume of 650 cm³ controlled to a predetermined temperature from the outside, and then an energy of about 30 J is applied thereto by fusing a platinum wire installed therein. The temperature and pressure changes in the pressure tight case occurring after the application are measured, thereby making it possible to confirm presence or absence of the self-decomposition reaction. When a pressure rise is less than 1 MPaG, absence of self-decomposition reaction is determined under the condition of this temperature and pressure.

<Ignition Test>

The ignition test is conducted by measuring the amount of pyrolyzed product of the working fluid to be a sample after the same test as the above-described self-decomposition test (temperature of 215° C. and pressure of 10 MPaG) is conducted. The case where the amount of pyrolyzed product is smaller than that obtained when a mixture of HFO-1123 and R32 to be 0=−1.000×[HFO-1123]+1.033×[R32] is subjected to the test is determined to satisfy the reference of (A2).

[Combustion Speed]

The property (B) is a property relating to the flammability and the composition satisfying Expression B is made, and thereby the combustion speed of each of the working fluid (R1) and the working fluid (R2) becomes less than 10 cm/sec. As is clear from Table 1, carbon dioxide, 1234yf, and 1234ze(E) are nonflammable or have a small combustion speed and the combustion speed of each of R152a, R161, propane, and propylene is as large as 10 cm/sec or more. In terms of the combustion speed, using carbon dioxide, 1234yf, and 1234ze(E) is preferred, but in terms of the other properties, for example, carbon dioxide tends to increase the burden on an apparatus because its compressor discharge gas pressure is high, which is not illustrated in Table 1, and 1234yf and 1234ze(E) are low in $RQ_{R410A}$, each have a small coefficient in Expression A and Expression A2 above, and have a low ability to suppress the self-decomposition of HFO-1123.

Expression B is an expression for bringing the combustion speed of the working fluid to less than 10 cm/sec when using such carbon dioxide, 1234yf, 1234ze(E), R152a, R161, propane, and propylene in combination with HFO-1123 and R32.

Expression B is expressed by "10>3.426×[HFO-1123]+5.673×[R32]+2.193×[1234yf]−0.596×[1234ze(E)]−0.768×[CO2]+29.897×[R152a]+64.400×[R161]+118.965×[propane]+94.943×[propylene]." In Expression B, regarding coefficients to multiply the content ratios of the compounds, the positive coefficient indicates ease of combustion and the negative coefficient indicates a suppression effect of combustion.

The combustion speed of each of the working fluid (R1) and the working fluid (R2) is preferably less than 8 cm/sec, more preferably less than 6 cm/sec, and further preferably less than 4 cm/sec. In this case, the composition only needs to be adjusted so as to satisfy Expression B2, Expression B3, and Expression B4 below in which the numeral to the left of the inequality sign in Expression B is set to 8, 6, and 4 respectively. As the combustion speed is lower, the working fluid becomes more excellent having high safety. Incidentally, the combustion speed is a combustion speed measured at a temperature of 23° C. based on IOS817: 2014.

$$8>3.426\times[HFO\text{-}1123]+5.673\times[R32]+2.193\times[1234yf]-0.596\times[1234ze(E)]-0.768\times[CO2]+29.897\times[R152a]+64.400\times[R161]+118.965\times[\text{propane}]+94.943\times[\text{propylene}] \quad \text{Expression B2;}$$

$$6 > 3.426 \times [\text{HFO-1123}] + 5.673 \times [R32] + 2.193 \times [1234yf] - 0.596 \times [1234ze(E)] - 0.768 \times [CO2] + 29.897 \times [R152a] + 64.400 \times [R161] + 118.965 \times [\text{propane}] + 94.943 \times [\text{propylene}] \quad \text{Expression B3;}$$

$$4 > 3.426 \times [\text{HFO-1123}] + 5.673 \times [R32] + 2.193 \times [1234yf] - 0.596 \times [1234ze(E)] - 0.768 \times [CO2] + 29.897 \times [R152a] + 64.400 \times [R161] + 118.965 \times [\text{propane}] + 94.943 \times [\text{propylene}] \quad \text{Expression B4;}$$

[$RDP_{R410A}$]

The property (C) is a property relating to the burden on an apparatus. $RDP_{R410A}$ is an index indicating the burden on the apparatus of the working fluid by a relative comparison with a burden on an apparatus of R410A as a replacement object. $RDP_{R410A}$ is, as described in Expression (Z) above, described by a value of a ratio of the compressor discharge gas pressure ($DP_{sample}$) when operating the standard refrigeration cycle under the above-described temperature condition (T) by using the working fluid (sample) to the compressor discharge gas pressure ($DP_{R410}A$) when operating the standard refrigeration cycle under the above-described temperature condition (T) by using R410A.

The compressor discharge gas pressure indicates the maximum pressure in the standard refrigeration cycle under the above-described temperature condition (T), and it is possible to expect the degree of a pressure burden on the apparatus when actually operating a heat cycle system of a refrigerating apparatus, an air-conditioning apparatus, or the like by using the working fluid based on this value. Incidentally, $RDP_{R410A}$ is found by a later-described method concretely.

The composition of the working fluid is designed to be a composition satisfying Expression C, thereby making it possible to obtain the working fluid (R1) and the working fluid (R2) each having $RDP_{R410A}$ being less than 1.78. The working fluid (R1) and the working fluid (R2) each have $RDP_{R410A}$ being less than 1.78, and thereby the pressure burden on the apparatus does not increase greatly when a predetermined apparatus operates the heat cycle system under predetermined conditions by using the working fluid as compared to the case where the same apparatus operates the heat cycle system under the same conditions by using R410A. That is, the composition of each of the working fluid (R1) and the working fluid (R2) satisfies Expression C, and thereby using the working fluid (R1) and the working fluid (R2) for the apparatus using R410A as the working fluid is almost possible without a large design change.

Expression C is expressed by "1.78>1.293×[HFO-1123]+1.029×[R32]+0.369×[1234yf]+0.354×[1234ze(E)]+3.807×[CO2]+0.229×[R152a]+0.406×[R161]+0.568×[propane]+0.719×[propylene]."

In Expression C, regarding coefficients to multiply the content ratios of the compounds, the coefficient larger than 1 means that $RDP_{R410}A$ is greater than 1, namely, the compressor discharge gas pressure is larger than that of R410A, and as the value is larger, the corresponding compound increases the burden on the apparatus of the working fluid to be obtained. The coefficient smaller than 1 means that $RDP_{R410A}$ is less than 1, namely the compressor discharge gas pressure is smaller than that of R410A, and as the value is smaller, the corresponding compound can reduce the burden on the apparatus of the working fluid to be obtained.

$RDP_{R410A}$ of each of the working fluid (R1) and the working fluid (R2) is preferably less than 1.74, more preferably less than 1.65, further preferably less than 1.4, and still further preferably less than 1.2. Incidentally, the lower limit of $RDP_{R410A}$ of each of the working fluid (R1) and the working fluid (R2) is not limited in particular. In this case, the composition only needs to be adjusted so as to satisfy Expression C2, Expression C3, Expression C4, and Expression C5 below in which the numeral to the left of the inequality sign in Expression C is set to 1.74, 1.65, 1.4, and 1.2 respectively.

$$1.74 > 1.293 \times [\text{HFO-1123}] + 1.029 \times [R32] + 0.369 \times [1234yf] + 0.354 \times [1234ze(E)] + 3.807 \times [CO2] + 0.229 \times [R152a] + 0.406 \times [R161] + 0.568 \times [\text{propane}] + 0.719 \times [\text{propylene}] \quad \text{Expression C2;}$$

$$1.65 > 1.293 \times [\text{HFO-1123}] + 1.029 \times [R32] + 0.369 \times [\mathbf{1234yf}] + 0.354 \times [\mathbf{1234ze(E)}] + 3.807 \times [CO2] + 0.229 \times [R152a] + 0.406 \times [R161] + 0.568 \times [\text{propane}] + 0.719 \times [\text{propylene}] \quad \text{Expression C3;}$$

$$1.4 > 1.293 \times [\text{HFO-1123}] + 1.029 \times [R32] + 0.369 \times [\mathbf{1234yf}] + 0.354 \times [\mathbf{1234ze(E)}] + 3.807 \times [CO2] + 0.229 \times [R152a] + 0.406 \times [R161] + 0.568 \times [\text{propane}] + 0.719 \times [\text{propylene}] \quad \text{Expression C4;}$$

$$1.2 > 1.293 \times [\text{HFO-1123}] + 1.029 \times [R32] + 0.369 \times [\mathbf{1234yf}] + 0.354 \times [\mathbf{1234ze(E)}] + 3.807 \times [CO2] + 0.229 \times [R152a] + 0.406 \times [R161] + 0.568 \times [\text{propane}] + 0.719 \times [\text{propylene}] \quad \text{Expression C5;}$$

[$RQ_{R410A}$]

The property (D) is a property relating to the refrigerating capacity (Q) in a refrigeration cycle system. The cycle performance required for application of the working fluid to the heat cycle is evaluated by the coefficient of performance and capacity. In the case of the heat cycle system being the refrigeration cycle system, the capacity is the refrigerating capacity, and the refrigerating capacity (Q) is an output (kW) in the refrigeration cycle system. $RQ_{R410A}$ is an index indicating the refrigerating capacity (Q) of the working fluid by a relative comparison with the refrigerating capacity (Q) of R410A as a replacement object. Incidentally, $RQ_{R410A}$ is found by a later-described method concretely.

In the working fluid containing the above-described compounds, the composition is designed to be a composition satisfying Expression D, and thereby the working fluid (R1) and the working fluid (R2) each having $RQ_{R410A}$ greater than 0.91 are obtained, resulting in that the refrigerating capacity does not decrease greatly as compared to R410A.

Expression D is expressed by "0.91<1.214×[HFO-1123]+1.133×[R32]+0.402×[1234yf]+0.346×[1234ze(E)]+3.359×[CO2]+0.323×[R152a]+0.548×[R161]+0.588×[propane]+0.725×[propylene]."

In Expression D, regarding coefficients to multiply the content ratios of the compounds, the coefficient larger than 1 means that $RQ_{R410A}$ is greater than 1, namely, the refrigerating capacity is larger than that of R410A, and as the value is larger, the corresponding compound can contribute to an improvement in the refrigerating capacity of the working fluid to be obtained. The coefficient smaller than 1 means that $RQ_{R410A}$ is less than 1, namely the refrigerating capacity is smaller than that of R410A, and as the value is smaller, the corresponding compound reduces the refrigerating capacity of the working fluid to be obtained.

$RQ_{R410A}$ of each of the working fluid (R1) and the working fluid (R2) is preferably greater than 0.95 and more preferably greater than 1. In this case, the composition only needs to be adjusted so as to satisfy Expression D2 and Expression D3 below in which the numeral to the left of the inequality sign in Expression D is set to 0.95 and 1 respectively. Incidentally, the upper limit of $RQ_{R410A}$ of each of the working fluid (R1) and the working fluid (R2) is not limited in particular.

$$0.95<1.214\times[HFO\text{-}1123]+1.133\times[R32]+0.402\times[\mathbf{1234}yf]+0.346\times[\mathbf{1234}ze(E)]+3.359\times[CO2]+0.323\times[R152a]+0.548\times[R161]+0.588\times[\text{propane}]+0.725\times[\text{propylene}]$$ Expression D2;

$$1<1.214\times[HFO\text{-}1123]+1.133\times[R32]+0.402\times[\mathbf{1234}yf]+0.346\times[\mathbf{1234}ze(E)]+3.359\times[CO2]+0.323\times[R152a]+0.548\times[R161]+0.588\times[\text{propane}]+0.725\times[\text{propylene}]$$ Expression D3;

[GWP]

The property (E) is a property relating to the GWP being an index measuring the effect of the working fluid on the global warming. Expression E is an expression indicating that the GWP in the working fluid is a weighted average of composition masses and the GWP found by the weighted average satisfies less than 160. The GWP of R410A, which is a replacement of the working fluid of the present invention, is 2088 to greatly affect the global environment. On the other hand, the GWP of each of the working fluid (R1) and the working fluid (R2) is less than 160 to less affect the global environment.

Expression E is expressed by "$160>0.3\times[HFO\text{-}1123]+675\times[R32]+4\times[1234yf]+6\times[1234ze(E)]+1\times[CO2]+124\times[R152a]+12\times[R161]+3.3\times[\text{propane}]+1.8\times[\text{propylene}]$."

As described above, coefficients to multiply the content ratios of the compounds in Expression E each are a GWP of each of the compounds independently. It is clear also from Expression E that R32 causes an increase in the GWP of the working fluid. The working fluid (R1) and the working fluid (R2) each are that the GWP is reduced and the other properties are maintained by partially replacing R32 that has good properties but is high in the GWP with another compound in the working fluid using HFO-1123 and R32 that is excellent in performance as a working fluid replaceable with conventional R410A.

The GWP of each of the working fluid (R1) and the working fluid (R2) is preferably less than 150, more preferably less than 120, further preferably less than 100, and still more preferably less than 70. In this case, the composition only needs to be adjusted so as to satisfy Expression E2, Expression E3, Expression E4, and Expression E5 below in which the numeral to the left of the inequality sign in Expression E is set to 150, 120, 100, and 70 respectively.

$$150>0.3\times[HFO\text{-}1123]+675\times[R32]+4\times[\mathbf{1234}yf]+6\times[\mathbf{1234}ze(E)]+1\times[CO2]+124\times[R152a]+12\times[R161]+3.3\times[\text{propane}]+1.8\times[\text{propylene}]$$ Expression E2;

$$120>0.3\times[HFO\text{-}1123]+675\times[R32]+4\times[\mathbf{1234}yf]+6\times[\mathbf{1234}ze(E)]+1\times[CO2]+124\times[R152a]+12\times[R161]+3.3\times[\text{propane}]+1.8\times[\text{propylene}]$$ Expression E3;

$$100>0.3\times[HFO\text{-}1123]+675\times[R32]+4\times[\mathbf{1234}yf]+6\times[\mathbf{1234}ze(E)]+1\times[CO2]+124\times[R152a]+12\times[R161]+3.3\times[\text{propane}]+1.8\times[\text{propylene}]$$ Expression E4;

$$70>0.3\times[HFO\text{-}1123]+675\times[R32]+4\times[\mathbf{1234}yf]+6\times[\mathbf{1234}ze(E)]+1\times[CO2]+124\times[R152a]+12\times[R161]+3.3\times[\text{propane}]+1.8\times[\text{propylene}]$$ Expression E5;

[$RCOP_{R410A}$]

The working fluid (R1) and the working fluid (R2) each have the property (D), and thereby the cycle performance becomes equivalent to that of R410A. Normally, the cycle performance of the working fluid depends on the capacity and the coefficient of performance. The coefficient of performance (COP) is a value obtained by dividing an output (kW) by motive power (kW) consumed to obtain the output (kW), which corresponds to energy consumption efficiency. As the value of the coefficient of performance is higher, it becomes possible to obtain a large output by a small input.

In the working fluid (R1), the working fluid (R2), and the working fluid of the present invention that contains one of the working fluid (R1) and the working fluid (R2) at a ratio of 90 to 100 mass %, $RCOP_{R410A}$ is preferred to be greater than 0.9, more preferably greater than 0.95, and further preferably greater than 1.

[Temperature Glide]

The working fluid of the present invention has a temperature glide of 10° C. or less when operating the standard refrigeration cycle system under the above-described temperature condition (T). Further, the working fluid (R1) and the working fluid (R2) each preferably have a temperature glide of 10° C. or less similarly. When a mixture is used as the working fluid, the mixture is preferred to be an azeotropic mixture or a pseudoazeotropic mixture such as R410A. A zeotropic composition has a problem of undergoing a composition change when put into a refrigerating and air-conditioning apparatus from a pressure container. Further, when a refrigerant leaks out from a refrigerating and air-conditioning apparatus, a refrigerant composition in the refrigerating and air-conditioning apparatus is highly likely to change, resulting in difficulty in recovery of the refrigerant composition to an initial state. In the meantime, the above-described problems can be avoided as long as the working fluid is an azeotropic or pseudoazeotropic mixture.

As an index to indicate the properties of the working fluid, the "temperature glide" is commonly used. The temperature glide is defined as properties that the initiation temperature and the completion temperature of a heat exchanger, for example, of evaporation in an evaporator or of condensation in a condenser differ from each other. The temperature glide of an azeotropic mixture refrigerant is 0, and the temperature glide of such a pseudoazeotropic mixture refrigerant as R410A is extremely close to 0.

The case of the temperature glide being large is a problem because, for example, an inlet temperature of an evaporator decreases, to make frosting more likely to occur. Further, in the heat cycle system, in order to improve heat exchange efficiency, it is common to make the working fluid flowing in a heat exchanger and a heat source fluid such as water or the air flow in counter-current flow, and the temperature difference of the heat source fluid is small in a stable operation state, and therefore, it is difficult to obtain a heat cycle system with good energy efficiency when the working fluid is a zeotropic mixed medium with a large temperature glide. Therefore, the zeotropic mixed medium with an appropriate temperature glide is desired.

HFO-1123 and R32 to be used for the working fluid of the present invention are a pseudoazeotropic mixture close to an azeotropic mixture, when contained within a composition range of 99:1 to 1:99 in mass ratio. That is, the temperature glide is substantially 0 even when HFO-123 and R32 are combined with any composition. Thus, when the temperature glide is set to 10° C. or less, it is not particularly necessary to consider the content ratio of R32 to HFO-1123 to be used for the working fluid. The kinds and the compositions of R152a, R161, propane, propylene, carbon dioxide, 1234yf, and 1234ze(E) that are used together with HFO-1123 and R32 are adjusted so that the temperature glide becomes 10° C. or less.

Incidentally, the temperature glide of each of the working fluid of the present invention and the working fluid (R1) and the working fluid (R2) is preferably 8° C. or less, more preferably 6° C. or less, and further preferably 4° C. or less.

As the standard refrigeration cycle system to be used to evaluate $RDP_{R410A}$, $RQ_{R410A}$, $RCOP_{R410A}$, and the temperature glide described above, a refrigeration cycle system whose schematic configuration diagram is illustrated in FIG. 1 is cited, for example. Hereinafter, there will be explained methods of finding the refrigerating capacity and the coefficient of performance of a predetermined working fluid using the refrigeration cycle system illustrated in FIG. 1.

A refrigeration cycle system 10 illustrated in FIG. 1 is a system schematically configured to include: a compressor 11 that compresses working fluid vapor A to make it into working fluid vapor B at high temperature and high pressure; a condenser 12 that cools and liquefies the working fluid vapor B emitted from the compressor 11 to make it into a working fluid C at low temperature and high pressure; an expansion valve 13 that expands the working fluid C emitted from the condenser 12 to make it into a working fluid D at low temperature and low pressure; an evaporator 14 that heats the working fluid D emitted from the expansion valve 13 to make it into the working fluid vapor A at high temperature and low pressure; a pump 15 that supplies load fluid E to the evaporator 14; and a pump 16 that supplies fluid F to the condenser 12.

In the refrigeration cycle system 10, the cycle of (i) to (iv) below is repeated.
(i) Compressing the working fluid vapor A emitted from the evaporator 14 in the compressor 11 to make it into the working fluid vapor B at high temperature and high pressure (hereinafter, to be referred to as an "AB process").
(ii) Cooling and liquefying the working fluid vapor B emitted from the compressor 11 by the fluid F in the condenser 12 to make it into the working fluid C at low temperature and high pressure. In this event, the fluid F is heated to be made into fluid F' and emitted from the condenser 12 (hereinafter, to be referred to as a "BC process").
(iii) Expanding the working fluid C emitted from the condenser 12 in the expansion valve 13 to make it into the working fluid D at low temperature and low pressure (hereinafter, to be referred to as a "CD process").
(iv) Heating the working fluid D emitted from the expansion valve 13 by the load fluid E in the evaporator 14 to make it into the working fluid vapor A at high temperature and low pressure. In this event, the load fluid E is cooled to be made into load fluid E' and emitted from the evaporator 14 (hereinafter, to be referred to as a "DA process").

The refrigeration cycle system 10 is a cycle system achieved by an adiabatic and isoentropic change, an isenthalpic change, and an isobaric change. The change of state of the working fluid can be expressed as a trapezoid having A, B, C, and D as vertices when the change is illustrated on a pressure-enthalpy line (curve) diagram illustrated in FIG. 2.

Figure 2:
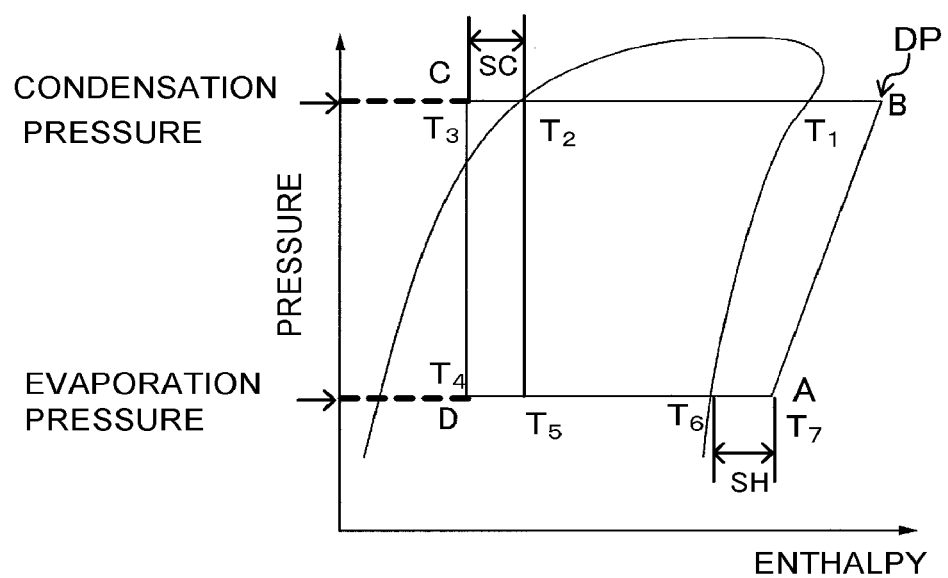
FIG. 2 is a cycle chart illustrating change of state of a working fluid in the refrigeration cycle system in FIG. 1 on a pressure-enthalpy line diagram.

The AB process is a process of performing adiabatic compression in the compressor 11 to make the working fluid vapor A at high temperature and low pressure into the working fluid vapor B at high temperature and high pressure, and is indicated by an AB line in FIG. 2. As will be described later, the working fluid vapor A is introduced, in a superheated state, into the compressor 11, and therefore the working fluid vapor B to be obtained therein is vapor also in a superheated state. The compressor discharge gas pressure (discharge pressure) used for calculating $RDP_{R410A}$ described above is a pressure (DP) in the state of B in FIG. 2 and is the highest pressure in the refrigeration cycle. Incidentally, the temperature in the state of B in FIG. 2 is a compressor discharge gas temperature (discharge temperature) and is the highest temperature in the refrigeration cycle.

The BC process is a process of performing isobaric cooling in the condenser 12 to make the working fluid vapor B at high temperature and high pressure into the working fluid vapor C at low temperature and high pressure, and is indicated by a BC line in FIG. 2. The pressure in this event is the condensation pressure. An intersection point $T_1$ on a high enthalpy side of intersection points of the pressure-enthalpy line and the BC line is a condensation temperature (an average temperature of the condensation start temperature and the condensation completion temperature in the case of the working fluid being a zeotropic mixture), and an intersection point $T_2$ on a low enthalpy side is a condensation boiling temperature. Here, the temperature glide in the case of the working fluid being a composition composed of a plurality of compounds is illustrated as the difference between $T_1$ and $T_2$.

The CD process is a process of performing isenthalpic expansion in the expansion valve 13 to make the working fluid C at low temperature and high pressure into the working fluid D at low temperature and low pressure, and is indicated by a CD line in FIG. 2. Incidentally, when the temperature at the working fluid C at low temperature and high pressure is indicated by $T_3$, $T_2$–$T_3$ is a degree of supercooling (SC) of the working fluid in the cycle of (i) to (iv).

The DA process is a process of performing isobaric heating in the evaporator 14 to return the working fluid D at low temperature and low pressure to the working fluid vapor A at high temperature and low pressure, and is indicated by a DA line in FIG. 2. The pressure in this event is the evaporation pressure. An intersection point $T_6$ on a high enthalpy side of intersection points of the pressure-enthalpy line and the DA line is an evaporation temperature (an average temperature of the evaporation start temperature and the evaporation completion temperature in the case of the working fluid being a zeotropic mixture). When the temperature of the working fluid vapor A is indicated by $T_7$, $T_7$–$T_6$ is a degree of superheating (SH) of the working fluid in the cycle of (i) to (iv). Incidentally, $T_4$ indicates the temperature of the working fluid D.

Q and COP of the working fluid are obtained from Equations (11) and (12) below respectively when using enthalpies $h_A$, $h_B$, $h_C$, and $h_D$ in respective states of A (after evaporation, high temperature and low pressure), B (after compression, high temperature and high pressure), C (after condensation, low temperature and high pressure), and D (after expansion, low temperature and low pressure) of the working fluid. It is assumed that there is no loss due to equipment efficiency and no pressure loss in pipes and heat exchangers.

The thermodynamic property required for calculation of the cycle performance of the working fluid can be calculated based on a generalized state equation (Soave-Redlich-Kwong equation) based on a principle of corresponding states, and on thermodynamic relational expressions. When the characteristic value cannot be obtained, calculation is performed using an estimation method based on an atomic group contribution method.

$$Q = h_A - h_D \tag{11}$$

$$COP = Q/\text{compression work} = (h_A - h_D)/(h_B - h_A) \tag{12}$$

Q expressed by ($h_A$–$h_D$) above corresponds to the output (kW) of the refrigeration cycle, and the compression work expressed by ($h_B-h_A$), for example, electric energy required to operate the compressor corresponds to the consumed motive power (kW). Further, Q means the capability of refrigerating the load fluid, and a higher Q means that the same heat cycle system can perform a larger amount of work. In other words, having a high Q indicates that a target performance can be obtained by a small amount of working fluid, thus enabling downsizing of the heat cycle system.

Here, the concrete composition of each of the working fluid (R1) and the working fluid (R2) is preferably a composition composed of three components or four components of HFO-1123, R32, and one or two selected from R152a, R161, propane, propylene, carbon dioxide, 1234yf, and 1234ze(E) and satisfying the above-described conditions and more preferably a composition composed of four components.

The composition of each of the working fluid (R1) and the working fluid (R2) is more preferably a composition composed of four components of HFO-1123, R32, one selected from R152a, R161, propane, and propylene, and one selected from carbon dioxide, 1234yf, and 1234ze(E) and satisfying the above-described conditions.

There are described concrete examples of combinations of the above-described preferred compounds in the working fluid (R1) and the working fluid (R2) in (1) to (12) below. However, regarding the following compositions of four components, the case where the content of one of the two selected from R152a, R161, propane, propylene, carbon dioxide, 1234yf, and 1234ze(E) is "0," namely the case where the composition is composed of three components may be included, but the composition composed of four components is more preferred.

(1) HFO-1123, R32, R152a, carbon dioxide
(2) HFO-1123, R32, R152a, 1234yf
(3) HFO-1123, R32, R152a, 1234ze(E)
(4) HFO-1123, R32, R161, carbon dioxide
(5) HFO-1123, R32, R161, 1234yf
(6) HFO-1123, R32, R161, 1234ze(E)
(7) HFO-1123, R32, propane, carbon dioxide
(8) HFO-1123, R32, propane, 1234yf
(9) HFO-1123, R32, propane, 1234ze(E)
(10) HFO-1123, R32, propylene, carbon dioxide
(11) HFO-1123, R32, propylene, 1234yf
(12) HFO-1123, R32, propylene, 1234ze(E)

When each of the working fluid (R1) and the working fluid (R2) is composed of such four components, the content ratios of these four components are found as in the following examples, for example. The followings are examples of the case of finding the composition satisfying Expression A to Expression E with the above-described combination of (4). The composition satisfying Expression A to Expression E can be found in the same manner also in the case of the other four components, namely even with the above-described combinations of (1) to (3) and (5) to (12), Further, the same is true of the case of finding compositions satisfying Expression A2, and Expression B to Expression E.

Figure 3:
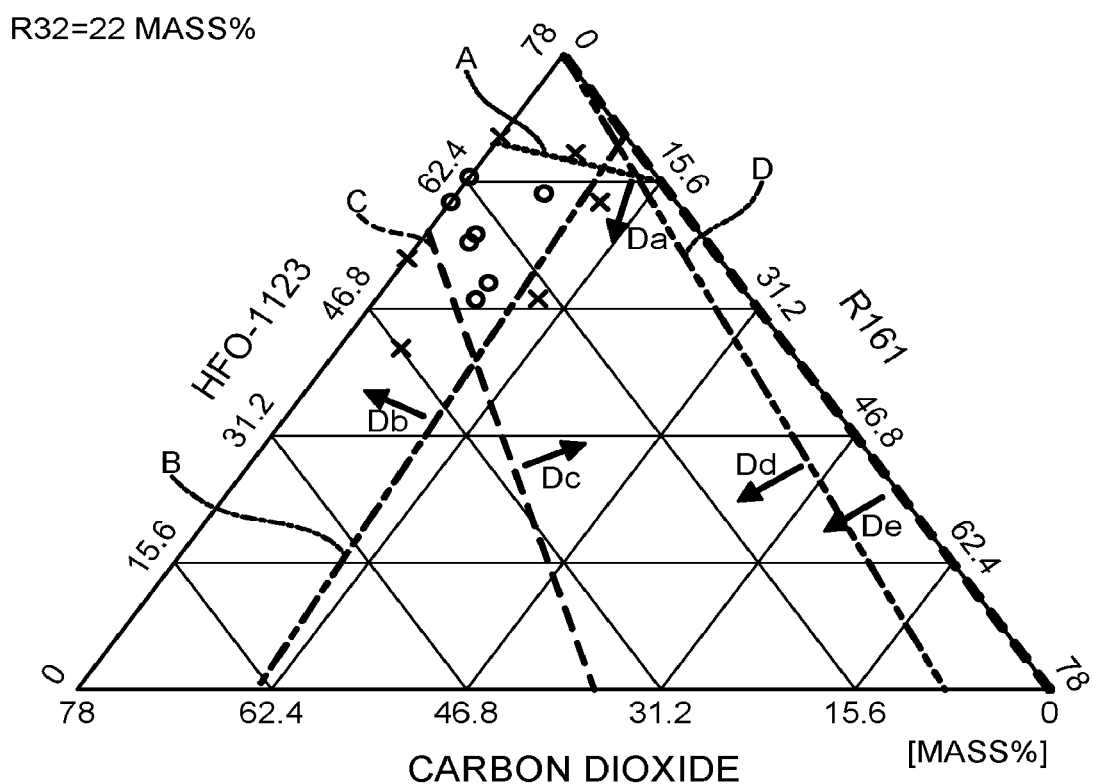
FIG. 3 is a view illustrating a composition range of one embodiment of a working fluid for heat cycle of the present invention in a triangular coordinate chart of a composition (mass %) of HFO-1123, carbon dioxide, and R161 when R32 in a mixture composed of HFO-1123, R32, carbon dioxide, and R161, where [R161] may be 0 mass %, is set to a predetermined amount.

The composition composed of HFO-1123, R32, carbon dioxide, and R161 and satisfying Expression A to Expression E is found by using, for example, a triangular coordinate chart of HFO-1123, carbon dioxide, and R161 illustrated in FIG. 3 in which the content of R32 is set to a fixed content (in FIG. 3, the ratio of R32 is 22 mass % relative to the total amount of HFO-1123, R32, carbon dioxide, and R161 (100 mass %)). In FIG. 3, "○" indicates a composition satisfying all of Expression A to Expression E and "x" indicates a composition not satisfying at least one of Expression A to Expression E.

In FIG. 3, Expression A to Expression E are satisfied within a quadrangular composition range surrounded by a straight line indicating the content of R161 being 0, a dotted line A for satisfying Expression A, a dot and dash line B for satisfying Expression B, and a broken line C for satisfying Expression C. A composition range in which Expression A is satisfied ranges in the direction of an arrow Da from the dotted line A, a composition range in which Expression B is satisfied ranges in the direction of an arrow Db from the dot and dash line B similarly, a composition range where Expression C is satisfied ranges in the direction of an arrow Dc from the broken line C, and a composition range where Expression D is satisfied ranges in the direction of an arrow Dd from a two-dot chain line D. When R32 is 22 mass %, [R32] is 0.22 and Expression E is achieved regardless of the content ratios of HFO-1123, carbon dioxide, and R161. An arrow De means that Expression E is achieved in the entire region of the triangular coordinate chart. Incidentally, the boundary line of Expression E is illustrated on the straight line indicating the content of carbon dioxide being 0 for convenience.

When a triangular coordinate chart similar to the above is formed under the condition that the content ratio of R32 is different from the above, for example, the ratio of R32 to the total amount of HFO-1123, R32, carbon dioxide, and R161 (100 mass %) is 15 mass %, a composition range where Expression A to Expression E are satisfied when the ratio of R 32 is 15 mass % can be found on the triangular coordinate chart. Triangular coordinate charts are formed while varying the content of R32 to the total amount of HFO-1123, R32, carbon dioxide, and R161 (100 mass %) as above and these triangular coordinate charts are integrated, thereby obtaining the composition of the working fluid (R1) that is composed of the above-described four components (4) of HFO-1123, R32, R161, and carbon dioxide and satisfies Expression A to Expression E.

(Working Fluid of the Present Invention)

The first working fluid contains, as described above, HFO-1123, R32, and at least one selected from R152a, R161, propane, propylene, carbon dioxide, 1234yf, and 1234ze(E) at the content ratios satisfying Expression A to Expression E so that the total content of them becomes 90 to 100 mass % relative to the total amount of the working fluid and has a temperature glide of 10° C. or less when operating the standard refrigeration cycle system under the temperature condition (T).

The second working fluid contains, as described above, HFO-1123, R32, and at least one selected from R152a, R161, propane, propylene, carbon dioxide, 1234yf, and 1234ze(E) at the content ratios satisfying Expression A2 and Expression B to Expression E so that the total content of them becomes 90 to 100 mass % relative to the total amount of the working fluid and has a temperature glide of 10° C. or less when operating the standard refrigeration cycle system under the temperature condition (T).

The contents of the respective components in the first working fluid and the second working fluid are not limited in particular providing that the above-described conditions are satisfied. The content of HFO-1123 in each of the first working fluid and the second working fluid is preferably 1 mass % or more and 80 mass % or less and more preferably 1 mass % or more and 24 mass % or less relative to the total content of HFO-1123, R32, R152a, R161, propane, propylene, carbon dioxide, 1234yf, and 1234ze(E) from the viewpoint of safety.

In the first working fluid of the present invention, Expression A to Expression E are satisfied, and thereby vaporized and liquefied components (to be referred to as "other components" simply hereinafter) other than the above-described components may be used together with these components as necessary providing that the working fluid (R1) having the above-described properties of (A) to (E) is contained by 90 to 100 mass % relative to the total amount of the working fluid and the above-described property relating to the temperature glide is satisfied. However, it is preferred that containing other components should not impair the above-described properties of (A) to (E) that the working fluid (R1) has.

In the second working fluid of the present invention, Expression A2 and Expression B to Expression E are satisfied, and thereby vaporized and liquefied components other than the above-described components may be used together with these components as necessary providing that the working fluid (R2) having the above-described properties of (A2) and (B) to (E) is contained by 90 to 100 mass % relative to the total amount of the working fluid and the above-described property relating to the temperature glide is satisfied. However, it is preferred that containing other components should not impair the above-described properties of (A2) and (B) to (E) that the working fluid (R2) has.

That is, of the present invention, the first working fluid is preferred to have the above-described properties of (A) to (E) that the working fluid (R1) has and the second working fluid is preferred to have the above-described properties of (A2) and (B) to (E) that the working fluid (R2) has. These working fluids of the present invention are particularly preferred to further have the properties relating to the combustion speed, $RDP_{R410A}$, $RQ_{R410A}$, and the GWP that are defined as preferable or more preferable in the working fluid (R1) and the working fluid (R2) described above. The temperature glide and $RCOP_{R410A}$ of the working fluids of the present invention are as described above.

When of the present invention, the first working fluid contains, other than the working fluid (R1), other components or the second working fluid contains, other than the working fluid (R2), other components, the total content of the other components in the working fluid is 10 mass % or less relative to 100 mass % of the working fluid, more preferably 8 mass % or less, and further preferably 5 mass % or less, and it is most preferred that other components should not be contained.

As the other components, there can be cited HFC, HFO, a hydrocarbon, chlorofluoroolefin (CFO), hydrochlouofluoroolefin (HCFO) and so on. As the other components, components having less effect on the ozone layer and less effect on global warming are preferred.

Examples of HFC include 1,2-difluoroethane, trifluoroethane, tetrafluoroethane, pentafluoroethane, pentafluoropropane, hexafluoropropane, heptafluoropropane, pentafluorobutane, heptafluorocyclopentane, and so on. As HFC, one may be used independently, or two or more may be used in combination.

Examples of HFO include 1,2-difluoroethylene (HFO-1132), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), 3,33-trifluoropropene (HFO-1243zf), (Z)-1,3,3,3-tetrafluoropropene (HFO-1234ze(Z)), and so on. As HFO, one may be used independently, or two or more may be used in combination.

Examples of a hydrocarbon include cyclopropane, butane, isobutane, pentane, isopentane and so on. As the hydrocarbon, one may be used independently, or two or more may be used in combination.

Examples of CFO include chlorofluoropropene, chlorofluoroethylene and so on. From the viewpoint of easily suppressing the flammability of the working fluid without greatly reducing the cycle performance of the working fluid, 1,1-dichloro-2,3,3,3-tetrafluoropropene (CFO-1214ya), 1,3-dichloro-1,2,3,3-tetrafluoropropene (CFO-1214yb), 1,2-dichloro-1,2-difluoroethylene (CFO-1112) are preferred as CFO. As CFO, one may be used independently, or two or more may be used in combination.

Examples of HCFO include hydrochlorofluoropropene, hydrochlorofluoroethylene and so on. From the viewpoint of easily suppressing the flammability of the working fluid without greatly reducing the cycle performance of the working fluid, 1-chloro-2,3,3,3,3-tetrafluoropropene (HCFO-1224yd), 1-chloro-1,2-difluoroethylene (HCFO-1122) are preferred as HCFO. As HCFO, one may be used independently, or two or more may be used in combination.

<Composition for Heat Cycle System>

The working fluid of the present invention is normally mixed with a lubricating oil when applied to a heat cycle system and the mixture can be used as a composition for heat cycle system. The composition for heat cycle system containing the working fluid of the present invention and the lubricating oil may further contain, besides these, known additives such as a stabilizer and a leakage detection substance.

(Lubricating Oil)

In the heat cycle system, the aforementioned working fluid may be used as a mixture with the lubricating oil. As the lubricating oil, a known lubricating oil used in heat cycle systems can be employed. The lubricating oil is contained together with the above-described working fluid in the composition for heat cycle system, circulates in the heat cycle system, and functions as a lubricating oil in particularly a compressor in the heat cycle system. In the heat cycle system, the lubricating oil is preferably one that ensures a lubricating ability and the hermeticity of the compressor and at the same time has sufficient compatibility with the working fluid under low-temperature conditions. From this point of view, the dynamic viscosity of the lubricating oil at 40° C. is preferably 1 to 750 mm$^2$/sec and more preferably 1 to 400 mm$^2$/sec. Further, its dynamic viscosity at 100° C. is preferably 1 to 100 mm$^2$/sec, and more preferably 1 to 50 mm$^2$/sec.

Examples of the lubricating oil include an ester-based lubricating oil, an ether-based lubricating oil, a fluorine-based lubricating oil, a hydrocarbon-based synthetic oil, a mineral oil, and so on.

The ester-based lubricating oil is an oily ester compound that has an ester bond in its molecule, and preferably has the above-described dynamic viscosity. Examples of the ester-based lubricating oil include dibasic acid ester, polyol ester, complex ester, polyol carbonate ester, and so on.

The dibasic acid ester is preferably an ester of dibasic acid with a carbon number of 5 to 10 (glutaric acid, adipic acid, pimelic acid, suberic acid, azelaic acid, sebacic acid, or the like) and monohydric alcohol with a carbon number of 1 to 15 that has a straight-chain alkyl group or a branched alkyl group (methanol, ethanol, propanol, butanol, pentanol, hexanol, heptanol, octanol, nonanol, decanol, undecanol, dodecanol, tridecanol, tetradecanol, pentadecanol, 2-ethylhexanol, isodecyl alcohol, 3-ethyl-3-hexanol, or the like). Concrete examples thereof include ditridecyl glutarate, di(2-ethylhexyl)adipate, diisodecyl adipate, ditridecyl adipate, di(3-ethyl-3-hexyl)sebacate, and so on.

The polyol ester is an ester synthesized from polyhydric alcohol and fatty acid (carboxylic acid).

The polyol ester is preferably an ester of diol (ethylene glycol, 1,3-propanediol, propylene glycol, 1,4-butanediol, 1,2-butanediol, 1,5-pentanediol, neopentyl glycol, 1,7-heptanediol, 1,12-dodecanediol, or the like) or polyol having 3 to 20 hydroxyl groups (trimethylolethane, trimethylolpropane, trimethylolbutane, pentaerythritol, glycerin, sorbitol, sorbitan, sorbitol glycerin condensate, or the like) and fatty acid with a carbon number of 6 to 20 (straight-chain or branched fatty acid such as hexanoic acid, heptanoic acid, octanoic acid, 2-ethylhexanoic acid, pelargonic acid, decanoic acid, undecanoic acid, dodecanoic acid, eicosanoic acid, or oleic acid, fatty acid having quaternary c carbon atoms, or the like). The polyol ester may have a free hydroxyl group.

The polyol ester is more preferably an ester (trimethylolpropane tripelargonate, pentaerythritol 2-ethylhexanoate, pentaerythritol tetrapelargonate, or the like) of hindered alcohol (neopentyl glycol, trimethylolethane, trimethylolpropane, trimethylolbutane, pentaerythritol or the like).

The complex ester is a combination (complex) of a plurality of types of esters. The complex ester oil is an oligoester of at least one selected from fatty acid and dibasic acid, and polyol. Examples of the fatty acid, the dibasic acid, and the polyol include the same ones as those cited as the dibasic acid ester and the polyol ester.

The polyol carbonate ester is an ester of carbonic acid and polyol, or a ring-opening polymer of a cyclic alkylene carbonate. Examples of the polyol include the same diols, polyols, and so on as those cited as the above-described polyol ester.

The ether-based lubricating oil is an oily ether compound that has an ether bond in its molecule, and preferably, has the above-described dynamic viscosity. Examples of the ether-based lubricating oil include polyalkylene glycol, polyvinyl ether, and so on.

The polyalkylene glycol is a compound having a plurality of oxyalkylene units, in other words, is a polymer or a copolymer of alkylene oxide.

Examples of the polyalkylene glycol include polyalkylene polyols obtained by a method of polymerizing alkylene oxide with a carbon number of 2 to 4 (ethylene oxide, propylene oxide, or the like), using water, alkane monool, the aforementioned diol, the aforementioned polyol, or the like as an initiator, those in which some or all of hydroxyl groups of the above are turned into alkyl ether, and so on.

The number of types of the oxyalkylene units in one molecule of the polyalkylene glycol may be one or may be two or more. The polyalkylene glycol is preferably one including at least an oxypropylene unit in one molecule, and is more preferably polypropylene glycol or a dialkyl ether of polypropylene glycol.

The polyvinyl ether is a polymer having at least a polymer unit derived from a vinyl ether monomer.

Examples of the polyvinyl ether include a polymer of vinyl ether monomers, a copolymer of a vinyl ether monomer and a hydrocarbon monomer having an olefinic double bond, a copolymer of a vinyl ether monomer and a vinyl ether monomer having a plurality of oxyalkylene units, and so on. Alkylene oxide forming the oxyalkylene unit is preferably any of those cited as the polyalkylene glycol as an example. These polymers each may be a block or random copolymer.

The vinyl ether monomer is preferably alkyl vinyl ether, and its alkyl group is preferably an alkyl group with a carbon number of 6 or less. Further, as the vinyl ether monomer, one may be used independently, or two or more may be used in combination. Examples of the hydrocarbon monomer having the olefinic double bond include ethylene, propylene, various types of butenes, various types of pentenes, various types of hexenes, various types of heptenes, various types of octenes, diisobutylene, triisobutylene, styrene, α-methylstyrene, various types of alkyl-substituted styrenes, and so on. As the hydrocarbon monomer having the olefinic double bond, one may be used independently, or two or more may be used in combination.

The fluorine-based lubricating oil is an oily fluorine-containing compound that has a fluorine atom in its molecule and, preferably, has the above-described dynamic viscosity.

Examples of the fluorine-based lubricating oil include a compound in which a hydrogen atom of a later-described mineral oil or hydrocarbon-based synthetic oil (for example, poly α-olefin, alkyl benzene, alkyl naphthalene, or the like) is replaced by a fluorine atom, a perfluoropolyether oil, a fluorinated silicone oil, and so on.

The mineral oil is obtained by refining a lubricating oil fraction obtained through atmospheric distillation or reduced-pressure distillation of a crude oil, by an appropriate combination of refining treatments (solvent deasphalting, solvent extraction, hydrocracking, solvent dewaxing, contact dewaxing, hydrorefining, clay treatment, and so on). Examples of the mineral oil include a paraffinic mineral oil, a naphthenic mineral oil, and so on.

The hydrocarbon-based synthetic oil is an oily synthesized compound whose molecule is composed only of a carbon atom and a hydrogen atom and that preferably, has the above-described dynamic viscosity. Examples of the hydrocarbon-based synthetic oil include poly α-olefin, alkyl benzene, alkyl naphthalene, and so on.

As the lubricating oil, one may be used independently, or two or more may be used in combination. As the lubricating oil, one or both of polyol ester and polyalkylene glycol are preferred from the viewpoint of compatibility with the working fluid, and the polyalkylene glycol is particularly preferred from the viewpoint of obtaining a prominent oxidation prevention effect by a stabilizer.

In the case where the mixture of the working fluid and the lubricating oil is used, the used amount of the lubricating oil may be any, provided that it falls within a range not causing a great reduction in the effect of the present invention, and may be appropriately determined according to its use, a type of the compressor, and so on. The total mass ratio of the lubricating oil in the composition for heat cycle system to the total mass, that is, 100 parts by mass, of the working fluid is preferably 10 to 100 parts by mass, and more preferably 20 to 50 parts by mass.

(Stabilizer)

The stabilizer is a component that improves the stability of the working fluid against heat and oxidation. Examples of the stabilizer include an oxidation resistance improver, a heat resistance improver, a metal deactivator, and so on.

The oxidation resistance improver is a stabilizer that stabilizes the working fluid by suppressing decomposition of the working fluid mainly due to oxygen, under a condition that the working fluid is repeatedly compressed heated in the heat cycle system.

Examples of the oxidation resistance improver include N,N'-diphenylphenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol, 4,4'-methylenebis(2,6-di-t- butylphenol), and so on. As the oxidation resistance improver, one may be used independently, or two or more may be used in combination.

The heat resistance improver is a stabilizer that stabilizes the working fluid by suppressing decomposition of the working fluid mainly due to heat, under a condition that the working fluid is repeatedly compressed-heated in the heat cycle system. Examples of the heat resistance improver include the same ones as those cited as the examples of the oxidation resistance improver. As the heat resistance improver, one may be used independently, or two or more may be used in combination.

The metal deactivator is used for the purpose of preventing a metal material in the heat cycle system from adversely affecting the working fluid and the lubricating oil or protecting the metal material from the working fluid and the lubricating oil. Concrete examples thereof include a chemical agent that forms a coating film on a surface of the metal material, and so on.

Examples of the metal deactivator include imidazole, benzimidazole, 2-mercaptobenzothiazole, 2,5-dimercaptothiadiazole, salicylidine-propylenediamine, pyrazole, benzotriazole, tolyltriazole, 2-methylbenzimidazole, 3,5-dimethylpyrazole, methylenebis-benzotriazole, organic acid, or esters of these, primary, secondary, or tertiary aliphatic amine, amine salt of organic acid or inorganic acid, a heterocyclic nitrogen-containing compound, amine salt of alkyl acid phosphate, or derivatives of these, and so on.

The total mass ratio of the stabilizer to the total mass (100 mass %) of the working fluid in the composition for heat cycle system may be any, provided that it falls within a range not causing a great reduction in the effect of the present invention, and is preferably 5 mass % or less, and more preferably 1 mass % or less.

(Known Additives Such as the Leakage Detection Substance)

The leakage detection substance refers to a substance in general that is added for the purpose of facilitating the detection of the working fluid and so on, using smell, fluorescence, or the like when the working fluid and so on leak from the heat cycle system.

Examples of the leakage detection substance include an ultraviolet fluorescent dye, an odor gas, an odor masking agent, and so on. Examples of the ultraviolet fluorescent dye include known ultraviolet fluorescent dyes such as those described in the specification of U.S. Pat. No. 4,249,412, JP-A-H10-502737, JP-A-2007-511645, JP-A-2008-500437, and JP-A-2008-531836.

The odor masking agent refers to a substance in general such as a compound or a perfume that is added in the case of the working fluid, the lubricating oil, and a later-described solubilizing agent having an unpleasant odor, for the purpose of improving the odor while maintaining properties of themselves. Examples of the odor masking agent include known perfumes such as those described in JP-A-2008-500437 and JP-A-2008-531836.

In the case of using the leakage detection substance, the solubilizing agent that improves solubility of the leakage detection substance in the working fluid may be used. Examples of the solubilizing agent include those described in JP-A-2007-511645, JP-A-2008-500437, and JP-A-2008-531836, and so on.

The total mass ratio of the leakage detection substance to the total mass (100 mass %) of the working fluid in the composition for heat cycle system may be any, provided that it falls within a range not causing a great reduction in the effect of the present invention, and is preferably 2 mass % or less, and more preferably 0.5 mass % or less.

<Heat Cycle System>

The heat cycle system of the present invention is a system using the composition for heat cycle system of the present invention. The heat cycle system of the present invention may be a heat pump system utilizing hot heat obtained in a condenser or may be a refrigeration cycle system utilizing cold heat obtained in an evaporator.

Concrete examples of the heat cycle system of the present invention include a refrigerating apparatus, an air-conditioning apparatus, a power generation system, a heat transport apparatus, a secondary cooling machine, and so on. Among them, the heat cycle system of the present invention is preferably used as an air-conditioning apparatus that is often installed outdoors or the like because this heat cycle system can exhibit cycle performance stably and safely even in a high-temperature working environment. Further, the heat cycle system of the present invention is also preferably used as a refrigerating apparatus.

Concrete examples of the air-conditioning apparatus include a room air-conditioner, packaged air-conditioners (such as a store packaged air-conditioner, a building packaged air-conditioner, and a plant packaged air-conditioner), a gas engine heat pump, a train air-conditioning system, an automobile air-conditioning system, and so on.

Concrete examples of the refrigerating apparatus include showcases (such as a built-in showcase and a separate showcase), an industrial fridge-freezer, a vending machine, an ice making machine, and so on.

As the power generation system, a power generation system by Rankine cycle system is preferred. As the power generation system, concretely, there can be cited as an example a system in which in an evaporator, a working fluid is heated by geothermal energy, solar heat, waste heat in a medium-to-high temperature range at about 50 to 200° C., or the like, the vaporized working fluid in a high temperature and high pressure state is adiabatically expanded by an expansion device, and a power generator is driven by the work generated by the adiabatic expansion to thereby perform power generation.

Further, the heat cycle system of the present invention may be a heat transport apparatus. As the heat transport apparatus, a latent heat transport apparatus is preferred.

As the latent heat transport apparatus, there can be cited a heat pipe conducting latent heat transport utilizing a phenomenon such as evaporation, boiling, or condensation of a working fluid filled in an apparatus and a two-phase closed thermosiphon apparatus. The heat pipe is applied to a relatively small-sized cooling apparatus such as a cooling apparatus of a heat generation part of a semiconductor element and electronic equipment. The two-phase closed thermosiphon apparatus is widely utilized for a gas/gas heat exchanger, accelerating snow melting and preventing freezing of roads, and the like because it does not require a wig and its structure is simple.

Incidentally, at the time of operation of the heat cycle system, in order to prevent occurrence of failure due to mixture of moisture and mixture of noncondensing gas such as oxygen, it is preferred to provide a means for suppressing the mixture of these.

Moisture, if mixed into the heat cycle system, may cause problems when the heat cycle system is used particularly at low temperature. For example, problems such as freezing in a capillary tube, hydrolysis of the working fluid and the lubricating oil, deterioration of material due to acid components generated in the cycle, generation of contaminants and so on occur. In particular, when the lubricating oil is the polyglycol oil, the polyester oil or the like, the lubricating oil is extremely high in hygroscopicity, is likely to cause a hydrolysis reaction, and decreases in characteristics as the lubricating oil, resulting in a major cause to lose the long-term reliability of the compressor. Accordingly, to suppress the hydrolysis of the lubricating oil, it is necessary to control the moisture concentration in the heat cycle system.

Examples of a method of controlling the moisture concentration in the heat cycle system include a method of using a moisture removing means such as a drying agent (silica gel, activated alumina, zeolite, or the like), or the like. Bringing the drying agent into contact with a liquid composition for heat cycle system is preferred in terms of dehydration efficiency. For example, the drying agent is preferably placed at an outlet of the condenser 12 or an inlet of the evaporator 14 to bring the drying agent into contact with the composition for heat cycle system.

As the drying agent, a zeolite-based drying agent is preferred from the viewpoint of chemical reactivity between the drying agent and the composition for heat cycle system and hygroscopic capacity of the drying agent.

As the zeolite-based drying agent, a zeolite-based drying agent containing a compound expressed by Formula (3) below as a main component is preferred from the viewpoint of being excellent in hygroscopic capacity in the case of using a lubricating oil higher in moisture absorption amount than a conventional mineral lubricating oil.

$$M_{2/n}O \cdot Al_2O_3 \cdot xSiO_2 \cdot yH_2O \quad (3)$$

Where M is an element of Group 1 such as Na or K or an element of Group 2 such as Ca, n is a valence of M, and x, y are values determined by a crystal structure. By changing M, a pore diameter can be adjusted.

In selecting the drying agent, a pore diameter and a breaking strength are important. In the case of using a drying agent having a pore diameter larger than a molecular diameter of the working fluid contained in the composition for heat cycle system, the working fluid is absorbed into the drying agent, and as a result, a chemical reaction occurs between the working fluid and the drying agent, thereby causing unfavorable phenomena such as generation of non-condensing gas, a decrease in strength of the drying agent, and a decrease in absorption capacity.

Accordingly, as the drying agent, it is preferred to use a zeolite-based drying agent having a small pore diameter. In particular, a sodium-potassium A type synthetic zeolite having a pore diameter of 3.5 angstrom or less is preferred. Applying the sodium-potassium A type synthetic zeolite having a pore diameter smaller than the molecular diameter of the working fluid makes it possible to selectively absorb and remove only moisture in the heat cycle system without absorbing the working fluid. In other words, since the absorption of the working fluid to the drying agent is unlikely to occur, thermal decomposition becomes less likely to occur, thereby making it possible to suppress deterioration of the material forming the heat cycle system and occurrence of contaminants.

The size of the zeolite-based drying agent is preferably about 0.5 to 5 mm as a representative value of the particle size since the zeolite-based drying agent having a too-small size causes clogging of the valve or pipe small portions in the heat cycle system, whereas the zeolite-based drying agent having a too-large size decreases the drying ability. The shape of the zeolite-based drying agent is preferably granular or cylindrical.

The zeolite-based drying agent can be made into an arbitrary shape by solidifying powdery zeolite with a binder (bentonite or the like). As long as the zeolite-based drying agent is used as a main body, another drying agent (silica gel, activated alumina or the like) may be used together. The use ratio of the zeolite-based drying agent to the composition for heat cycle system is not particularly limited.

Further, the noncondensing gas, if entering the inside of the heat cycle system, has adverse effects such as failure of heat transfer in the condenser and the evaporator and an increase in working pressure, and therefore the mixture of the noncondensing gas needs to be suppressed as much as possible. In particular, oxygen being one noncondensing gas reacts with the working fluid and the lubricating oil to promote decomposition.

The concentration of the noncondensing gas is preferably 1.5 volume % or less and particularly preferably 0.5 volume % or less by volume percent with respect to the working fluid in a gas phase part of the working fluid.

According to the above-described heat cycle system of the present invention, use of the working fluid of the present invention makes it possible to obtain practically sufficient cycle performance high in safety while suppressing the effect on global warming.

EXAMPLES

Hereinafter, the present invention will be explained in detail by examples, but the present invention is not limited to the following examples. Examples 1 to 7, 14 to 16, 22 to 24, 29 to 31, 36 to 40, 45 to 51, 56 to 58, 62 to 64, 69 to 71, 75 to 77, 80, 81, 85, 86, 91 to 96, and 98 to 101 are examples, and Examples 8 to 13, 17 to 21, 25 to 28, 32 to 35, 41 to 44, 52 to 55, 59 to 61, 65 to 68, 72 to 74, 78, 79, 82 to 84, 87 to 90, and 97 are comparative examples.

Examples 1 to 101

In Examples 1 to 101, working fluids obtained by mixing HFO-1123, R32, and one or more selected from R152a, R161, propane, propylene, carbon dioxide, 1234yf, and 1234ze(E) at ratios illustrated in Table 2 to Table 6 were fabricated, and of the working fluids, a GWP, self-decomposition, a combustion speed, $RDP_{R410A}$, $RQ_{R410A}$, $RCOP_{R410A}$, and a temperature glide were calculated or measured by the above-described methods. Results are illustrated in Table 2 to Table 6 together with compositions.

TABLE 2

| Example | Compound/Evaluation item [Unit] | Composition (Mass %) | GWP | Self decomposition (215° C., 10MPaG) | Combustion speed [cm/sec] |
|---|---|---|---|---|---|
| 1 | HFO-1123/R32/Carbon dioxide/R161 | 61/22/10/7 | 149.6 | Absent | 7.8 |
| 2 | HFO-1123/R32/Carbon dioxide/R161 | 56/22/18/4 | 149.3 | Absent | 5.6 |
| 3 | HFO-1123/R32/Carbon dioxide/R161 | 50/22/20/8 | 149.8 | Absent | 8.0 |
| 4 | HFO-1123/R32/Carbon dioxide/R161 | 63/22/15/0 | 148.8 | Absent | <4 |
| 5 | HFO-1123/R32/Carbon dioxide/R161 | 60/22/18/0 | 148.9 | Absent | <4 |

TABLE 2-continued

| | Compound | Composition | | | |
|---|---|---|---|---|---|
| 6 | HFO-1123/R32/Carbon dioxide/R161 | 48/22/22/8 | 149.8 | Absent | 7.9 |
| 7 | HFO-1123/R32/Carbon dioxide/R161 | 55/22/19/4 | 149.3 | Absent | 5.6 |
| 8 | HFO-1123/R32/Carbon dioxide/R161 | 53/22/25/0 | 148.9 | Absent | <4 |
| 9 | HFO-1123/R32/Carbon dioxide/R161 | 42/22/31/5 | 149.5 | Absent | 5.7 |
| 10 | HFO-1123/R32/Carbon dioxide/R161 | 68/22/10/0 | 148.8 | Present | <4 |
| 11 | HFO-1123/R32/Carbon dioxide/R161 | 66/22/5/7 | 149.6 | Present | 8.0 |
| 12 | HFO-1123/R32/Carbon dioxide/R161 | 60/22/6/12 | 150.2 | Absent | >10 |
| 13 | HFO-1123/R32/Carbon dioxide/R161 | 48/22/17/13 | 150.4 | Absent | >10 |
| 14 | HFO-1123/R32/Carbon dioxide/R161 | 64/15/18/3 | 102.0 | Absent | 4.8 |
| 15 | HFO-1123/R32/Carbon dioxide/R161 | 54/15/22/9 | 102.7 | Absent | 8.3 |
| 16 | HFO-1123/R32/Carbon dioxide/R161 | 62/15/14/9 | 102.7 | Absent | 8.7 |
| 17 | HFO-1123/R32/Carbon dioxide/R161 | 48/15/30/7 | 102.5 | Absent | 6.8 |
| 18 | HFO-1123/R32/Carbon dioxide/R161 | 52/15/21/12 | 103.1 | Absent | >10 |
| 19 | HFO-1123/R32/Carbon dioxide/R161 | 61/15/12/12 | 103.0 | Absent | >10 |
| 20 | HFO-1123/R32/Carbon dioxide/R161 | 58/15/27/0 | 101.7 | Absent | <4 |

| Example | $RCOP_{R410A}$ | $RQ_{R410A}$ | Temperature glide [° C.] | $RDP_{R410A}$ | Achieved (◯) or Not Achieved(X) the condition |
|---|---|---|---|---|---|
| 1 | 0.98 | 1.39 | 4.9 | 1.42 | ◯ |
| 2 | 0.95 | 1.58. | 6.3 | 1.65 | ◯ |
| 3 | 0.97 | 1.57 | 7.5 | 1.61 | ◯ |
| 4 | 0.94 | 1.56 | 4.8 | 1.67 | ◯ |
| 5 | 0.93 | 1.62 | 5.4 | 1.74 | ◯ |
| 6 | 0.96 | 1.60 | 7.8 | 1.66 | ◯ |
| 7 | 0.95 | 1.59 | 6.4 | 1.68 | ◯ |
| 8 | 0.90 | 1.73 | 6.2 | 1.90 | X |
| 9 | 0.92 | 1.77 | 8.1 | 1.90 | X |
| 10 | 0.95 | 1.46 | 3.7 | 1.54 | X |
| 11 | 0.98 | 1.27 | 3.3 | 1.30 | X |
| 12 | 1.00 | 1.25 | 4.4 | 1.26 | X |
| 13 | 0.99 | 1.45 | 7.6 | 1.45 | X |
| 14 | 0.93 | 1.59 | 6.2 | 1.71 | ◯ |
| 15 | 0.95 | 1.60 | 8.5 | 1.67 | ◯ |
| 16 | 0.98 | 1.45 | 6.8 | 1.49 | ◯ |
| 17 | 0.91 | 1.74 | 8.8 | 1.88 | X |
| 18 | 0.97 | 1.55 | 9.0 | 1.58 | X |
| 19 | 0.99 | 1.38 | 6.9 | 1.40 | X |
| 20 | 0.87 | 1.76 | 6.1 | 2.01 | X |

TABLE 3

| Example | Compound/ Evaluation item [Unit] | Composition (Mass %) | GWP | Self decomposition (215° C., 10MPaG) | Combustion speed [cm/sec] |
|---|---|---|---|---|---|
| 21 | HFO-1123/R32/Carbon dioxide/R161 | 70/15/10/5 | 102.2 | Present | 6.4 |
| 22 | HFO-1123/R32/Carbon dioxide/R161 | 67/10/19/4 | 68.4 | Absent | 5.3 |
| 23 | HFO-1123/R32/Carbon dioxide/R161 | 65/10/16/9 | 68.9 | Absent | 8.5 |
| 24 | HFO-1123/R32/Carbon dioxide/R161 | 61/10/22/7 | 68.7 | Absent | 7.0 |
| 25 | HFO-1123/R32/Carbon dioxide/R161 | 55/10/23/12 | 69.3 | Absent | >10 |
| 26 | HFO-1123/R32/Carbon dioxide/R161 | 64/10/26/0 | 68.0 | Absent | <4 |
| 27 | HFO-1123/R32/Carbon dioxide/R161 | 52/10/31/7 | 68.8 | Absent | 6.6 |
| 28 | HFO-1123/R32/Carbon dioxide/R161 | 74/10/11/5 | 68.4 | Present | 6.2 |
| 29 | HFO-1123/R32/Carbon dioxide/R161 | 69/5/20/6 | 34.9 | Absent | 6.4 |
| 30 | HFO-1123/R32/Carbon dioxide/R161 | 68/5/18/9 | 35.2 | Absent | 8.3 |
| 31 | HFO-1123/R32/Carbon dioxide/R161 | 63/5/23/9 | 35.2 | Absent | 8.1 |
| 32 | HFO-1123/R32/Carbon dioxide/R161 | 70/5/23/2 | 34.4 | Absent | <4 |
| 33 | HFO-1123/R32/Carbon dioxide/R161 | 67/5/16/12 | 35.6 | Absent | >10 |
| 34 | HFO-1123/R32/Carbon dioxide/R161 | 60/5/28/7 | 35.1 | Absent | 6.6 |
| 35 | HFO-1123/R32/Carbon dioxide/R161 | 76/5/13/6 | 34.8 | Present | 6.7 |
| 36 | HFO-1123/R32/1234yf/R161 | 48/22/30/0 | 149.8 | Absent | <4 |
| 37 | HFO-1123/R32/1234yf/R161 | 49/22/24/5 | 150.2 | Absent | 6.7 |
| 38 | HFO-1123/R32/1234yf/R161 | 45/22/33/0 | 150.0 | Absent | <4 |
| 39 | HFO-1123/R32/1234yf/R161 | 50/22/19/9 | 150.5 | Absent | 9.2 |
| 40 | HFO-1123/R32/1234yf/R161 | 44/22/26/8 | 150.6 | Absent | 7.7 |

| Example | $RCOP_{R410A}$ | $RQ_{R410A}$ | Temperature glide [° C.] | $RDP_{R410A}$ | Achieved (◯) or Not Achieved(X) the condition |
|---|---|---|---|---|---|
| 21 | 0.97 | 1.41 | 4.9 | 1.47 | X |
| 22 | 0.93 | 1.60 | 6.9 | 1.74 | ◯ |

TABLE 3-continued

| | | | | | |
|---|---|---|---|---|---|
| 23 | 0.97 | 1.49 | 7.7 | 1.55 | ○ |
| 24 | 0.94 | 1.62 | 8.3 | 1.73 | ○ |
| 25 | 0.96 | 1.58 | 9.9 | 1.64 | X |
| 26 | 0.86 | 1.74 | 6.0 | 2.03 | X |
| 27 | 0.90 | 1.75 | 9.1 | 1.94 | X |
| 28 | 0.96 | 1.43 | 5.4 | 1.51 | X |
| 29 | 0.93 | 1.59 | 8.1 | 1.73 | ○ |
| 30 | 0.96 | 1.53 | 8.7 | 1.61 | ○ |
| 31 | 0.94 | 1.61 | 9.5 | 1.73 | ○ |
| 32 | 0.88 | 1.67 | 6.9 | 1.92 | X |
| 33 | 0.98 | 1.46 | 9.0 | 1.50 | X |
| 34 | 0.90 | 1.71 | 9.3 | 1.90 | X |
| 35 | 0.96 | 1.46 | 6.6 | 1.55 | X |
| 36 | 1.01 | 0.95 | 6.4 | 0.95 | ○ |
| 37 | 1.01 | 0.96 | 5.6 | 0.97 | ○ |
| 38 | 1.02 | 0.92 | 6.6 | 0.93 | ○ |
| 39 | 1.01 | 0.97 | 5.0 | 0.98 | ○ |
| 40 | 1.02 | 0.93 | 5.7 | 0.92 | ○ |

TABLE 4

| Example | Compound/Evaluation item [Unit] | Composition (Mass %) | GWP | Self decomposition (215° C., 10MPaG) | Combustion speed [cm/sec] |
|---|---|---|---|---|---|
| 41 | HFO-1123/R32/1234yf/R161 | 59/22/14/5 | 149.8 | Present | 6.8 |
| 42 | HFO-1123/R32/1234yf/R161 | 50/22/16/12 | 150.7 | Absent | >10 |
| 43 | HFO-1123/R32/1234yf/R161 | 42/22/24/12 | 151.0 | Absent | >10 |
| 44 | HFO-1123/R32/1234yf/R161 | 40/22/33/5 | 150.5 | Absent | 6.6 |
| 45 | HFO-1123/R32/1234ze(E)/R161 | 48/22/29/1 | 150.5 | Absent | <4 |
| 46 | HFO-1123/R32/1234ze(E)/R161 | 49/22/25/4 | 150.6 | Absent | 5.4 |
| 47 | HFO-1123/R32/1234ze(E)/R161 | 50/22/20/8 | 150.8 | Absent | 8.0 |
| 48 | HFO-1123/R32/1234ze(E)/R161 | 45/22/26/7 | 151.0 | Absent | 5.2 |
| 49 | HFO-1123/R32/1234ze(E)/R161 | 45/22/29/4 | 150.9 | Absent | 5.2 |
| 50 | HFO-1123/R32/1234ze(E)/R161 | 51/22/18/9 | 150.8 | Absent | 8.8 |
| 51 | HFO-1123/R32/1234ze(E)/R161 | 48/22/30/0 | 150.4 | Absent | <4 |
| 52 | HFO-1123/R32/1234ze(E)/R161 | 51/22/15/12 | 151.0 | Absent | >10 |
| 53 | HFO-1123/R32/1234ze(E)/R161 | 42/22/31/5 | 151.1 | Absent | 5.7 |
| 54 | HFO-1123/R32/1234ze(E)/R161 | 59/22/14/5 | 150.1 | Present | 6.4 |
| 55 | HFO-1123/R32/1234ze(E)/R161 | 45/22/21/12 | 151.3 | Absent | >10 |
| 56 | HFO-1123/R32/Carbon dioxide/Propane | 64/22/10/4 | 148.9 | Absent | 7.9 |
| 57 | HFO-1123/R32/Carbon dioxide/Propane | 64/22/13/1 | 148.9 | Absent | 4.5 |
| 58 | HFO-1123/R32/Carbon dioxide/Propane | 55/22/19/4 | 149.0 | Absent | 6.9 |
| 59 | HFO-1123/R32/Carbon dioxide/Propane | 54/22/17/7 | 149.1 | Absent | >10 |
| 60 | HFO-1123/R32/Carbon dioxide/Propane | 65/22/5/8 | 149.0 | Absent | >10 |

| Example | $RCOP_{R410A}$ | $RQ_{R410A}$ | Temperature glide [° C.] | $RDP_{R410A}$ | Achieved (○) or Not Achieved(X) the condition |
|---|---|---|---|---|---|
| 41 | 0.99 | 1.03 | 4.2 | 1.06 | X |
| 42 | 1.01 | 0.98 | 4.7 | 0.98 | X |
| 43 | 1.03 | 0.92 | 5.5 | 0.91 | X |
| 44 | 1.03 | 0.90 | 6.3 | 0.89 | X |
| 45 | 1.00 | 0.94 | 8.0 | 0.95 | ○ |
| 46 | 1.00 | 0.95 | 7.2 | 0.96 | ○ |
| 47 | 1.00 | 0.96 | 6.3 | 0.97 | ○ |
| 48 | 1.01 | 0.93 | 7.4 | 0.93 | ○ |
| 49 | 1.01 | 0.92 | 7.9 | 0.92 | ○ |
| 50 | 1.00 | 0.97 | 5.9 | 0.98 | ○ |
| 51 | 1.01 | 0.94 | 8.2 | 0.95 | ○ |
| 52 | 1.00 | 0.98 | 5.4 | 0.98 | X |
| 53 | 1.02 | 0.90 | 8.2 | 0.90 | X |
| 54 | 0.99 | 1.03 | 4.8 | 1.06 | X |
| 55 | 1.02 | 0.93 | 6.5 | 0.93 | X |
| 56 | 0.96 | 1.43 | 3.9 | 1.50 | ○ |
| 57 | 0.95 | 1.51 | 4.4 | 1.61 | ○ |
| 58 | 0.93 | 1.60 | 5.8 | 1.72 | ○ |
| 59 | 0.95 | 1.55 | 5.9 | 1.64 | X |
| 60 | 0.97 | 1.27 | 2.8 | 1.32 | X |

TABLE 5

| Example | Compound/Evaluation item [Unit] | Composition (Mass %) | GWP | Self decomposition (215° C., 10MPaG) | Combustion speed [cm/sec] |
|---|---|---|---|---|---|
| 61 | HFO-1123/R32/Carbon dioxide/Propane | 70/22/5/3 | 148.9 | Present | 7.2 |
| 62 | HFO-1123/R32/1234yf/Propane | 56/22/17/5 | 149.5 | Absent | 9.7 |
| 63 | HFO-1123/R32/1234yf/Propane | 44/22/30/4 | 150.0 | Absent | 9.7 |
| 64 | HFO-1123/R32/1234yf/Propane | 51/22/25/2 | 149.7 | Absent | 5.9 |
| 65 | HFO-1123/R32/1234yf/Propane | 60/22/10/8 | 149.3 | Absent | >10 |
| 66 | HFO-1123/R32/1234yf/Propane | 41/22/35/2 | 150.1 | Absent | 5.8 |
| 67 | HFO-1123/R32/1234yf/Propane | 44/22/27/7 | 149.9 | Absent | >10 |
| 68 | HFO-1123/R32/1234yf/Propane | 62/22/14/2 | 149.3 | Present | 6.1 |
| 69 | HFO-1123/R32/1234ze(E)/Propane | 51/22/25/2 | 150.2 | Absent | 5.2 |
| 70 | HFO-1123/R32/1234ze(E)/Propane | 45/22/29/4 | 150.5 | Absent | 6.2 |
| 71 | HFO-1123/R32/1234ze(E)/Propane | 46/22/26/6 | 150.4 | Absent | 9.8 |
| 72 | HFO-1123/R32/1234ze(E)/Propane | 60/22/10/8 | 149.5 | Absent | >10 |
| 73 | HFO-1123/R32/1234ze(E)/Propane | 43/22/33/2 | 150.7 | Absent | 4.9 |
| 74 | HFO-1123/R32/1234ze(E)/Propane | 63/22/13/2 | 149.5 | Present | 5.7 |
| 75 | HFO-1123/R32/Carbon dioxide/Propane | 62/22/11/5 | 148.9 | Absent | 7.1 |
| 76 | HFO-1123/R32/Carbon dioxide/Propane | 63/22/13/2 | 148.9 | Absent | 5.2 |
| 77 | HFO-1123/R32/Carbon dioxide/Propane | 54/22/20/4 | 148.9 | Absent | 4.9 |
| 78 | HFO-1123/R32/Carbon dioxide/Propane | 60/22/9/9 | 148.9 | Absent | >10 |
| 79 | HFO-1123/R32/Carbon dioxide/Propane | 68/22/7/3 | 148.8 | Present | 6.4 |
| 80 | HFO-1123/R32/1234yf/Propylene | 49/22/25/4 | 149.7 | Absent | 6.2 |

| Example | $RCOP_{R410A}$ | $RQ_{R410A}$ | Temperature glide [° C.] | $RDP_{R410A}$ | Achieved (○) or Not Achieved(X) the condition |
|---|---|---|---|---|---|
| 61 | 0.96 | 1.31 | 2.2 | 1.38 | X |
| 62 | 0.98 | 1.02 | 4.0 | 1.05 | ○ |
| 63 | 1.02 | 0.92 | 6.1 | 0.92 | ○ |
| 64 | 1.00 | 0.97 | 5.5 | 0.99 | ○ |
| 65 | 0.97 | 1.05 | 2.7 | 1.10 | X |
| 66 | 1.02 | 0.90 | 6.5 | 0.90 | X |
| 67 | 1.00 | 0.94 | 5.2 | 0.96 | X |
| 68 | 0.97 | 1.05 | 3.7 | 1.10 | X |
| 69 | 0.99 | 0.97 | 6.9 | 0.99 | ○ |
| 70 | 1.00 | 0.93 | 7.5 | 0.95 | ○ |
| 71 | 0.99 | 0.95 | 6.6 | 0.97 | ○ |
| 72 | 0.97 | 1.05 | 3.0 | 1.10 | X |
| 73 | 1.01 | 0.91 | 8.5 | 0.92 | X |
| 74 | 0.97 | 1.06 | 4.0 | 1.11 | X |
| 75 | 0.96 | 1.45 | 3.8 | 1.52 | ○ |
| 76 | 0.95 | 1.51 | 4.3 | 1.60 | ○ |
| 77 | 0.93 | 1.63 | 5.5 | 1.75 | ○ |
| 78 | 0.96 | 1.37 | 3.4 | 1.44 | X |
| 79 | 0.96 | 1.37 | 2.7 | 1.44 | X |
| 80 | 0.99 | 0.98 | 5.4 | 1.00 | ○ |

TABLE 6

| Example | Compound/Evaluation item [Unit] | Composition (Mass %) | GWP | Self decomposition (215° C., 10MPaG) | Combustion speed [cm/sec] |
|---|---|---|---|---|---|
| 81 | HFO-1123/R32/1234yf/Propylene | 43/22/31/4 | 149.9 | Absent | 6.4 |
| 82 | HFO-1123/R32/1234yf/Propylene | 50/22/21/7 | 149.6 | Absent | >10 |
| 83 | HFO-1123/R32/1234yf/Propylene | 58/22/18/2 | 149.4 | Present | 5.5 |
| 84 | HFO-1123/R32/1234yf/Propylene | 41/22/35/2 | 150.1 | Absent | 5.3 |
| 85 | HFO-1123/R32/1234ze(E)/Propane | 50/22/23/5 | 150.1 | Absent | 6.8 |
| 86 | HFO-1123/R32/1234ze(E)/Propane | 45/22/28/5 | 150.4 | Absent | 6.6 |
| 87 | HFO-1123/R32/1234ze(E)/Propane | 50/22/20/8 | 150.0 | Absent | >10 |
| 88 | HFO-1123/R32/1234ze(E)/Propane | 45/22/25/8 | 150.3 | Absent | >10 |
| 89 | HFO-1123/R32/1234ze(E)/Propane | 42/22/34/2 | 150.7 | Absent | 4.4 |
| 90 | HFO-1123/R32/1234ze(E)/Propane | 58/22/18/2 | 149.8 | Present | 5.0 |
| 91 | HFO-1123/R32/1234ze(E)/Propane | 49/22/28/1 | 150.3 | Absent | <4 |
| 92 | HFO-1123/R32/Carbon dioxide/R152a | 61/22/9/8 | 158.7 | Absent | 5.7 |
| 93 | HFO-1123/R32/Carbon dioxide/R152a | 55/22/15/8 | 158.7 | Absent | 5.4 |
| 94 | HFO-1123/R32/Carbon dioxide/R152a | 62/15/3/20 | 126.3 | Absent | 8.9 |
| 95 | HFO-1123/R32/Carbon dioxide/R152a | 60/18/0/22 | 149.0 | Absent | 7.0 |
| 96 | HFO-1123/R32/Carbon dioxide/R152a | 61/16/0/23 | 136.7 | Absent | 9.9 |
| 97 | HFO-1123/R32/Carbon dioxide/R152a | 53/18/0/29 | 157.6 | Absent | >10 |
| 98 | HFO-1123-R32/1234yf/R152a | 50/22/20/8 | 159.4 | Absent | 5.8 |
| 99 | HFO-1123-R32/1234yf/R152a | 55/19/6/20 | 153.5 | Absent | 9.1 |

TABLE 6-continued

| | | | | | |
|---|---|---|---|---|---|
| 100 | HFO-1123/R32/1234ze(E)/R152a | 50/22/20/8 | 159.4 | Absent | 5.8 |
| 101 | HFO-1123/R32/1234ze(E)/R152a | 55/19/6/20 | 153.5 | Absent | 9.1 |

| Example | $RCOP_{R410A}$ | $RQ_{R410A}$ | Temperature glide [° C.] | $RDP_{R410A}$ | Achieved (○) or Not Achieved(X) the condition |
|---|---|---|---|---|---|
| 81 | 1.01 | 0.94 | 6.1 | 0.95 | ○ |
| 82 | 0.99 | 1.00 | 4.6 | 1.03 | X |
| 83 | 0.98 | 1.03 | 4.5 | 1.07 | X |
| 84 | 1.02 | 0.91 | 6.6 | 0.91 | X |
| 85 | 0.98 | 0.98 | 6.2 | 1.01 | ○ |
| 86 | 1.00 | 0.95 | 7.4 | 0.97 | ○ |
| 87 | 0.98 | 1.00 | 5.3 | 1.04 | X |
| 88 | 0.99 | 0.97 | 6.5 | 0.99 | X |
| 89 | 1.01 | 0.91 | 8.8 | 0.91 | X |
| 90 | 0.98 | 1.02 | 5.3 | 1.07 | X |
| 91 | 1.00 | 0.95 | 7.7 | 0.97 | ○ |
| 92 | 0.99 | 1.33 | 7.6 | 1.35 | ○ |
| 93 | 0.98 | 1.46 | 9.5 | 1.49 | ○ |
| 94 | 1.02 | 1.06 | 9.1 | 1.04 | ○ |
| 95 | 1.02 | 0.95 | 7.8 | 0.95 | ○ |
| 96 | 1.02 | 0.94 | 8.0 | 0.94 | ○ |
| 97 | 1.04 | 0.90 | 9.0 | 0.87 | X |
| 98 | 1.02 | 0.95 | 7.0 | 0.94 | ○ |
| 99 | 1.02 | 0.93 | 8.0 | 0.92 | ○ |
| 100 | 1.01 | 0.94 | 7.7 | 0.94 | ○ |
| 101 | 1.02 | 0.93 | 8.1 | 0.92 | ○ |

The working fluid for heat cycle, the composition for heat cycle system, and the heat cycle system using the working fluid and the composition of the present invention can be utilized for refrigerating apparatuses (such as a built-in showcase, a separate showcase, an industrial fridge-freezer, a vending machine, and an ice making machine), air-conditioning apparatuses (such as a room air-conditioner, a store packaged air-conditioner, a building packaged air-conditioner, a plant packaged air-conditioner, a gas engine heat pump, a train air-conditioning system, and an automobile air-conditioning system), a power generation system (such as exhaust heat recovery power generation), and a heat transport apparatus (such as a heat pipe).

What is claimed is:

1. A working fluid for heat cycle, comprising:
trifluoroethylene, difluoromethane, and
at least two compounds selected from the group consisting of 1,1-difluoroethane, fluoroethane, propane, propylene, carbon dioxide, 2,3,3,3-tetrafluoropropene, and (E)-1,3,3,3-tetrafluoropropene, wherein
the total content ratio of trifluoroethylene, difluoromethane, 1,1-difluoroethane, fluoroethane, propane, propylene, carbon dioxide, 2,3,3,3-tetrafluoropropene, and (E)-1,3,3,3-tetrafluoropropene relative to the total amount of the working fluid for heat cycle is 90 to 100 mass %,
content ratios by mass of the respective compounds satisfy all Expressions A, B, C, D and E or all Expressions A2, B, C, D and E below when the total content of trifluoroethylene, difluoromethane, 1,1-difluoroethane, fluoroethane, propane, propylene, carbon dioxide, 2,3,3,3-tetrafluoropropene, and (E)-1,3,3,3-tetrafluoropropene contained in the working fluid for heat cycle is set to 1, and
a temperature glide is 10° C. or less when operating a standard refrigeration cycle system under a temperature condition (T) that in the case of the working fluid for heat cycle being a zeotropic mixture, an average temperature of an evaporation start temperature and an evaporation completion temperature is 0° C., in the case of the working fluid for heat cycle being an azeotropic mixture, an evaporation temperature is 0° C., in the case of the working fluid for heat cycle being a zeotropic mixture, an average temperature of a condensation start temperature and a condensation completion temperature is 40° C., in the case of the working fluid for heat cycle being an azeotropic mixture, a condensation temperature is 40° C., a degree of supercooling (SC) is 5° C., and a degree of superheating (SH) is 5° C., $$0<-1.000\times[UFO\text{-}1123]+1.179\times[R32]+1.316\times[1234yf]+1.316\times[1234ze(E)]+3.831\times[CO2]+2.632\times[R152a]+2.390\times[R161]+6.262\times[\text{propane}]+2.237\times[\text{propylene}],$$ Expression A;

$$0<-1.000\times[HFO\text{-}1123]+1.033\times[R32]+0.896\times[1234yf]+0.896\times[1234ze(E)]+2.891\times[CO2]+1.955\times[R152a]+1.410\times[R161]+3.737\times[\text{propane}]+1.520\times[\text{propylene}],$$ Expression A2;

$$10>3.426\times[HFO\text{-}1123]+5.673\times[R32]+2.193\times[1234yf]-0.596\times[1234ze(E)]-0.768\times[CO2]+29.897\times[R152a]+64.400\times[R161]+118.965\times[\text{propane}]+94.943\times[\text{propylene}],$$ Expression B;

$$1.78>1.293\times[HFO\text{-}1123]+1.029\times[R32]+0.369\times[1234yf]+0.354\times[1234ze(E)]+3.807\times[CO2]+0.229\times[R152a]+0.406\times[R161]+0.568\times[\text{propane}]+0.719\times[\text{propylene}],$$ Expression C;

$$0.91<1.214\times[BYO\text{-}1123]+1.133\times[R32]+0.402\times[1234yf]+0.346\times[1234ze(E)]+3.359\times[CO2]+0.323\times[R152a]+0.548\times[R161]+0.588\times[\text{propane}]+0.725\times[\text{propylene}], \text{ and}$$ Expression D;

$$160>0.3\times[HFO\text{-}1123]+675\times[R32]+4\times[1234yf]+6\times[1234ze(E)]+1\times[CO2]+124\times[R152a]+12\times[R161]+3.3\times[\text{propane}]+1.8\times[\text{propylene}],$$ Expression E;

where in Expression A to Expression E, [HFO-1123] represents the content ratio by mass of trifluoroethylene, [R32] represents the content ratio by mass of difluoromethane, [R152a] represents the content ratio by mass of 1,1-difluoroethane, [R161] represents the content ratio by mass of fluoroethane, [propane] represents the content ratio by mass of propane, [propylene] represents the content ratio by mass of propylene, [CO2] represents the content ratio by mass of carbon dioxide, [1234yf] represents the content ratio by mass of 2,3,3,3-tetrafluoropropene, and [1234ze(E)] represents the content ratio by mass of (E)-1,3,3,3-tetrafluoropropene respectively when the total content of trifluoroethylene, difluoromethane, 1,1-difluoroethane, fluoroethane, propane, propylene, carbon dioxide, 2,3,3,3-tetrafluoropropene, and (E)-1,3,3,3-tetrafluoropropene is set to 1.

2. The working fluid for heat cycle according to claim 1 satisfying Expression B2 below in place of Expression B above, $$8 > 3.426 \times [\text{FIFO-1123}] + 5.673 \times [R32] + 2.193 \times [1234yf] - 0.596 \times [1234ze(E)] - 0.768 \times [CO2] + 29.897 \times [R152a] + 64.400 \times [R161] + 118.965 \times [\text{propane}] + 94.943 \times [\text{propylene}].$$ Expression B2;

3. The working fluid for heat cycle according to claim 1 satisfying Expression B3 below in place of Expression B above, $$6 > 3.426 \times [\text{FIFO-1123}] + 5.673 \times [R32] + 2.193 \times [1234yf] - 0.596 \times [1234ze(E)] - 0.768 \times [CO2] + 29.897 \times [R152a] + 64.400 \times [R161] + 118.965 \times [\text{propane}] + 94.943 \times [\text{propylene}].$$ Expression B3;

4. The working fluid for heat cycle according to claim 1 satisfying Expression C3 below in place of Expression C above, $$1.65 > 1.293 \times [HFO\text{-}1123] + 1.029 \times [R32] + 0.369 \times [1234yf] + 0.354 \times [1234ze(E)] + 3.807 \times [CO2] + 0.229 \times [R152a] + 0.406 \times [R161] + 0.568 \times [\text{propane}] + 0.719 \times [\text{propylene}].$$ Expression C3;

5. The working fluid for heat cycle according to claim 1 satisfying Expression D3 below in place of Expression D above, $$1 < 1.214 \times [HFO\text{-}1123] + 1.133 \times [R32] + 0.402 \times [1234yf] + 0.346 \times [1234ze(E)] + 3.359 \times [CO2] + 0.323 \times [R152a] + 0.548 \times [R161] + 0.588 \times [\text{propane}] + 0.725 \times [\text{propylene}].$$ Expression D3;

6. The working fluid for heat cycle according to claim 1 satisfying Expression E3 below in place of Expression E above, $$120 > 0.3 \times [HFO\text{-}1123] + 675 \times [R32] + 4 \times [1234yf] + 6 \times [1234ze(E)] + 1 \times [CO2] + 124 \times [R152a] + 12 \times [R161] + 3.3 \times [\text{propane}] + 1.8 \times [\text{propylene}].$$ Expression E3;

7. The working fluid for heat cycle according to claim 1, wherein the temperature glide is 6° C. or less.

8. The working fluid for heat cycle according to claim 1, wherein a relative coefficient of performance ($RCOP_{R410A}$) calculated by Expression (Y) below is greater than 0.9, $$\text{Relative coefficient of performance } (RCOP_{R410A}) = \frac{\text{Coefficient of performance of sample } (COP_{sample})}{\text{Coefficient of performance of } R410A \ (COP_{R410A})} \quad (Y)$$

in Expression (Y), R410A represents a mixture of difluoromethane and pentafluoroethane at a mass ratio of 1:1 and a sample indicates a working fluid to be evaluated relatively, and coefficients of performance of the sample and R410A each are a value obtained by dividing an output (kW) when operating the standard refrigeration cycle system under the temperature condition (T) using the sample and R410A by consumed power (kW) required for the operation.

9. The working fluid for heat cycle according to claim 8, wherein the $RCOP_{R410A}$ is greater than 0.95.

10. The working fluid for heat cycle according to claim 1, wherein the content ratio of trifluoroethylene relative to the total content of trifluoroethylene, difluoromethane, 1,1-difluoroethane, fluoroethane, propane, propylene, carbon dioxide, 2,3,3,3-tetrafluoropropene, and (E)-1,3,3,3-tetrafluoropropene is 1 mass % or more and 80 mass % or less.

11. The working fluid for heat cycle according to claim 1, wherein the content ratio of difluoromethane relative to the total content of trifluoroethylene, difluoromethane, 1,1-difluoroethane, fluoroethane, propane, propylene, carbon dioxide, 2,3,3,3-tetrafluoropropene, and (E)-1,3,3,3-tetrafluoropropene is 1 mass % or more and 24 mass % or less.

12. A composition for heat cycle system comprising the working fluid for heat cycle according to claim 1 and a lubricating oil.

13. A heat cycle system using the composition for heat cycle system according to claim 12.

14. The heat cycle system according to claim 13, wherein the heat cycle system is a refrigerating apparatus, an air-conditioning apparatus, a power generation system, a heat transport apparatus, or a secondary cooling machine.

15. The working fluid for heat cycle according to claim 1, comprising trifluoroethylene, difluoromethane, and at least two compounds selected from the group consisting of propane, carbon dioxide, 2,3,3,3-tetrafluoropropene, and (E)-1,3,3,3-tetrafluoropropene.

16. The working fluid for heat cycle according to claim 1, comprising trifluoroethylene, difluoromethane, propane, and carbon dioxide.

17. The working fluid for heat cycle according to claim 1, comprising trifluoroethylene, difluoromethane, propane, and 2,3,3,3-tetrafluoropropene.

18. The working fluid for heat cycle according to claim 1, comprising trifluoroethylene, difluoromethane, propane and (E)-1,3,3,3-tetrafluoropropene.

19. The working fluid for heat cycle according to claim 16, wherein the total amount of the trifluoroethylene and difluoromethane is at least 77 mass % based on the total mass of the trifluoroethylene, difluoromethane, propane, and carbon dioxide.

20. The working fluid for heat cycle according to claim 17, wherein the total amount of the trifluoroethylene and difluoromethane is at least 66 mass % based on the total mass of the trifluoroethylene, difluoromethane, propane, and 2,3,3,3-tetrafluoropropene.

21. The working fluid for heat cycle according to claim 18, wherein the total amount of the trifluoroethylene and difluoromethane is at least 67 mass % based on the total mass of the trifluoroethylene, difluoromethane, propane and (E)-1,3,3,3-tetrafluoropropene.

* * * * *